(12) United States Patent
Tsukagoshi et al.

(10) Patent No.: US 10,862,941 B2
(45) Date of Patent: Dec. 8, 2020

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventors: Ikuo Tsukagoshi, Tokyo (JP); Toru Chinen, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 278 days.

(21) Appl. No.: 15/568,899

(22) PCT Filed: May 10, 2016

(86) PCT No.: PCT/JP2016/063928
§ 371 (c)(1),
(2) Date: Oct. 24, 2017

(87) PCT Pub. No.: WO2016/190091
PCT Pub. Date: Dec. 1, 2016

(65) Prior Publication Data
US 2018/0103082 A1  Apr. 12, 2018

(30) Foreign Application Priority Data
May 28, 2015  (JP) .................. 2015-109115

(51) Int. Cl.
*G06F 15/16* (2006.01)
*H04L 29/06* (2006.01)
(Continued)

(52) U.S. Cl.
CPC ......... *H04L 65/607* (2013.01); *H04N 21/233* (2013.01); *H04N 21/236* (2013.01); *H04N 21/436* (2013.01)

(58) Field of Classification Search
CPC ........................... H04L 65/607; H04N 21/233
(Continued)

(56) References Cited

U.S. PATENT DOCUMENTS

2008/0267414 A1* 10/2008 Mukaide ................. H04S 1/007
381/23
2010/0159973 A1* 6/2010 Thomas ............... H04W 76/45
455/509
(Continued)

FOREIGN PATENT DOCUMENTS

| EP | 2 391 139 A2 | 11/2011 |
| JP | 2012-010311 A | 1/2012 |
| WO | WO 2012/133064 | 4/2012 |

OTHER PUBLICATIONS

Extended European Search Report dated Jan. 30, 2019 in Patent Application No. 16799799.8, 9 pages.
(Continued)

*Primary Examiner* — Duyen M Doan
(74) *Attorney, Agent, or Firm* — Oblon, McClelland, Maier & Neustadt, L.L.P.

(57) ABSTRACT

To enable, on a receiving side, processing obtaining predetermined information to be performed easily and appropriately in a case the predetermined information is divided into a predetermined number of audio frames and transmitted. The predetermined information is inserted into an audio compressed data stream. The audio compressed data stream into which the predetermined information is inserted is transmitted. It is possible to insert each of the pieces of divided information obtained by dividing the predetermined information into the predetermined number of audio frames of the audio compressed data stream. Information indicating the overall size of the predetermined information is added to a first piece of divided information. It is possible to ensure space for storing the predetermined information in a storage medium on the basis of the information indicating the overall size of the predetermined information at a time point where the first piece of divided information is obtained.

14 Claims, 23 Drawing Sheets

(51) Int. Cl.
*H04N 21/436* (2011.01)
*H04N 21/236* (2011.01)
*H04N 21/233* (2011.01)

(58) Field of Classification Search
USPC .................................................. 709/231, 203
See application file for complete search history.

(56) References Cited

U.S. PATENT DOCUMENTS

| | | | |
|---|---|---|---|
| 2011/0292173 A1 | 12/2011 | Tsukagoshi | |
| 2012/0253826 A1* | 10/2012 | Kitazato | H04H 60/13 704/500 |
| 2014/0071236 A1* | 3/2014 | Tsukagoshi | H04N 21/236 348/43 |

OTHER PUBLICATIONS

"WD of ISO/IEC TR 23008-13 2nd Edition" MPEG Media Transport Implementation Guidelines 111. MPEG Meeting, Feb. 6, 2015-Feb. 20, 2015, Geneva, (Motion Picture Expert Group or ISO/IEC JTC1/SC29/WG11), No. N15235, XP030021961, Mar. 4, 2015, 83 pages.

"White Paper on MPEG-D Dynamic Range Control" Communication Subgroup, 111. MPEG Meeting, Feb. 6, 2015-Feb. 20, 2015, Geneva, (Motion Picture Expert Group or ISO/IEC JTC1/SC29/WG11), No. N15071, XP030021804, Feb. 24, 2015, 19 Pages.

Simone Füg, et al., "Design, Coding and Processing of Metadata for Object-Based Interactive Audio", Audio Engineering Society Society 137, Convention Paper 2097, XP040639006, Oct. 8, 2014, 12 pages.

Jürgen Herre, et al., "MPEG-H Audio—The New Standard for Universal Spatial/3D Audio Coding" JAES, Audio Engineering Society, vol. 62, No. 12, XP040670747, Jan. 5, 2015, 12 Pages.

Mitsuhiro Hirabayashi, et al., "Requirement of 23008-3 AMD1 3D Audio File Format Support", Sony Corporation, (Motion Picture Expert Group or ISO/IEC JTC1/SC29/WG11), No. M34348, XP030062721, Jul. 2, 2014, 7 pages.

Combined Chinese Office Action and Search Report dated Sep. 30, 2019, in Chinese Patent Application No. 201680029051.4 (with unedited computer generated English translation).

Summons to attend oral proceedings pursuant to Rule 115(1) EPC issued Feb. 10, 2020 in corresponding European Patent Application No. 16 799 799.8, 6 pages.

International Search Report dated Aug. 9, 2016 in PCT/JP2016/063928 filed May 10, 2016.

Office Action dated Jun. 2, 2020 in Japanese Patent Application No. 2017-520606.

* cited by examiner

FIG. 5

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| /* reserved for ISO use */ | 8-127 |
| /* reserved for use outside of ISO scope */ | 128 and higher |
| ID_EXT_ELE_universal_metadata | 128 |

FIG. 6

| Syntax | No. of Bits | Format |
|---|---|---|
| universal_metadata_frame syntax | | |
| universal_metadata_frame(){ | | |
|   organization_id | 32 | bslbf |
|   metadata_type | 8 | uimsbf |
|   packet_length | 8 | uimsbf |
|   data_id | 8 | uimsbf |
|   start_flag | 1 | bslbf |
|   fcounter | 7 | uimsbf |
|   if( start_flag ) | | |
|     total_data_size | 16 | uimsbf |
|     packet_length -= 4 | | |
|   } | | |
|   else { | | |
|     packet_length -= 2 | | |
|   } | | |
|   while ( packet_length-- ) { | | |
|     bytes_to_carry_access_information | 8 | bslbf |
|   } | | |
| } | | |

FIG. 7 access_information syntax

| Syntax | No. of Bits | Format |
|---|---|---|
| Access_information(){ | | |
|   information_type | 8 | uimsbf |
|   information_length | 16 | uimsbf |
|   switch (information_type) { | | |
|     case " 0x01" : /* access information */ | | |
|       url_length | 8 | uimsbf |
|       while ( url_length--) | | |
|         bytes | 8 | bslbf |
|       break; | | |
|     case " 0x02" : /* action command */ | | |
|       command_type | 8 | uimsbf |
|       break; | | |
|     case " 0x03" : /* media file */ | | |
|       media_file() | | |
|       break; | | |
|     default : | | |
|   } | | |
| } | | |

FIG. 8

| semantics | |
|---|---|
| organization_id (32bits) | INDICATES TARGET OF STANDARD TO BE APPLIED. |
| metadata_type (8bits) | INDICATES TYPE OF METADATA.<br>'0x10' INDICATES MPEG-H FORMAT UNIVERSAL METADATA. |
| data_id (8bits) | INDICATES IDENTIFIER OF CONTAINER TARGET DATA. |
| start_flag (1bit) | INDICATES START OF CONTAINER TARGET DATA. |
| fcounter (7bits) | INDICATES DIVIDED POSITION OF DIVIDED CONTAINER TARGET DATA BY COUNTS IN DESCENDING ORDER.<br>"0" INDICATES LAST DIVIDED PORTION, OR INDICATES NO DIVISION. |
| total_data_size (16bits) | INDICATES SIZE OF CONTAINER TARGET DATA.<br>RESULTING IN total_data_size = information_length |
| Information_type (8bits) | INDICATES TYPE OF CONTAINER TARGET DATA.<br>'0x01' URL INFORMATION<br>'0x02' COMMAND GROUP (start/pause/resume/stop/teardown)<br>'0x03' MEDIA FILE (audio file, av file) |
| information_length (16bits) | INDICATES SIZE OF CONTAINER TARGET DATA STARTING WITH NEXT ELEMENT. |
| url_length (8bts) | INDICATES URL INFORMATION SIZE. |

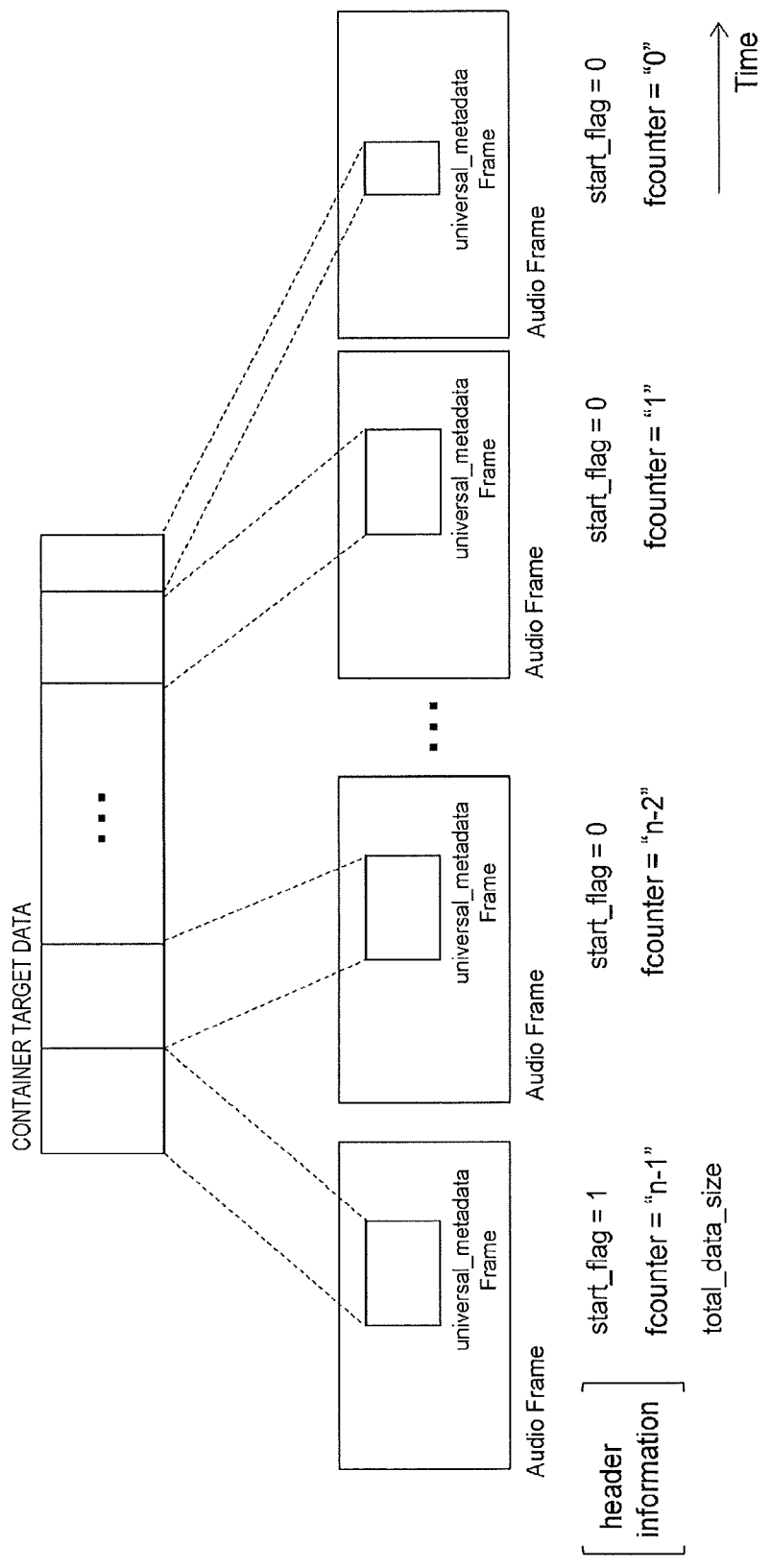

(2) CASE WHERE CONTAINER TARGET DATA (PREDETERMINED INFORMATION) IS TRANSMITTED VIA ONE universal_metadata frame

FIG. 19 descriptor 'Application descriptor' Syntax

| Syntax | No. of Bits | Format |
|---|---|---|
| Application_descriptor( ) { | | |
| descriptor_tag | 8 | bslbf |
| descriptor_length | 16 | bslbf |
| Access_information() | | |
| } | | |
| } | | |

TRANSMISSION APPARATUS, TRANSMISSION METHOD, RECEPTION APPARATUS, AND RECEPTION METHOD

CROSS-REFERENCE

This application is a National Phase of PCT Application No. PCT/JP2016/063928, filed May 10, 2016, which claims priority to Japan Application No. 2015-109115, filed May 28, 2015.

TECHNICAL FIELD

The present technology relates to a transmission apparatus, a transmission method, a reception apparatus, and a reception method, and more particularly to a transmission apparatus, or the like, configured to insert predetermined information into an audio compressed data stream and transmit the same.

BACKGROUND ART

For example, Patent Document 1 proposes a technique in which predetermined information is inserted into an audio compressed data stream from a broadcasting station, a distribution server, or the like, and transmitted, and the set top box on the receiving side directly transmits the audio compressed data stream to the television receiver via an HDMI digital interface, and then, the television receiver performs information processing using the predetermined information.

CITATION LIST

Patent Document

Patent Document 1: Japanese Patent Application Laid-Open No. 2012-010311

SUMMARY OF THE INVENTION

Problems to be Solved by the Invention

An object of the present technology is to make it possible on a receiving side to easily and appropriately perform processing of obtaining predetermined information in a case where the predetermined information is divided into a predetermined number of audio frames and transmitted.

Solutions to Problems

A concept of the present technology is a transmission apparatus including:

an information insertion unit configured to insert predetermined information into an audio compressed data stream; and a stream transmission unit configured to transmit the audio compressed data stream into which the predetermined information is inserted, in which the information insertion unit is capable of inserting each of pieces of divided information obtained by dividing the predetermined information into a predetermined number of audio frames of the audio compressed data stream, and adds information indicating the overall size of the predetermined information to a first piece of divided information.

In the present technology, the predetermined information is inserted into the audio compressed data stream by the information insertion unit. For example, the predetermined information may be one of network access information, command information, and a media file.

An audio compressed data stream into which the predetermined information is inserted is transmitted by the stream transmission unit. For example, the stream transmitter may be configured to transmit a container of a predetermined format including an audio compressed data stream into which the predetermined information is inserted.

Moreover, for example, the stream transmission unit may be configured to transmit the audio compressed data stream into which the predetermined information is inserted to an external device via a digital interface. In this case, for example, the stream transmission unit may further include a reception unit configured to receive a container of a predetermined format including the audio compressed data stream, predetermined information may be inserted in a layer of the container, and the information insertion unit may insert the predetermined information inserted in the layer of the container into the compressed audio data included in the container.

The information insertion unit is capable of inserting each of the pieces of divided information obtained by dividing predetermined information into a predetermined number of audio frames of the audio compressed data stream, and information indicating the overall size of the predetermined information is added to a first piece of divided information. For example, the information insertion unit may insert the divided information into a user data region of the audio frame. Moreover, for example, the information insertion unit may be configured to further add information indicating whether the divided information is the first piece of divided information and information indicating a divided position to each of the pieces of divided information.

In this manner, in the present technology, it is possible to insert each of the pieces of divided information obtained by dividing the predetermined information into the predetermined number of audio frames of the audio compressed data stream. With this configuration, it is possible to suppress the size of information inserted in each of the audio frames even when the overall size of the predetermined information is large, and to satisfactorily transmit the predetermined information without affecting the transmission of the audio compressed data.

Moreover, in the present technology, when each of the pieces of divided information obtained by dividing predetermined information is inserted into a predetermined number of audio frames of the audio compressed data stream, information indicating the overall size of the predetermined information is added to the first piece of divided information. With this configuration, when obtaining each of the pieces of divided information constituting the predetermined information from the predetermined number of audio frames, it is possible on the receiving side to ensure sufficient space for storing the predetermined information in a storage medium on the basis of the information indicating the overall size of the predetermined information at a time point where the first piece of divided information is obtained, and to easily and appropriately perform processing of obtaining the predetermined information.

Moreover, another concept of the present technology is a reception apparatus including a stream reception unit configured to receive an audio compressed data stream into which predetermined information is inserted, from an external device via a digital interface, each of pieces of divided information obtained by dividing the predetermined information being inserted in a predetermined number of audio frames of the audio compressed data stream, information indicating the overall size of the predetermined information being added to a first piece of divided information, and the reception apparatus further including a control unit configured to control decode processing of obtaining audio data by decoding the audio compressed data stream and obtaining each of the pieces of divided information constituting the predetermined information from the predetermined number of audio frames on the basis of the information indicating the overall size of the predetermined information and configured to control information processing using the predetermined information obtained by the decode processing.

In the present technology, the audio compressed data stream into which predetermined information is inserted is received from the external device via the digital interface by the reception unit. For example, the predetermined information may be one of network access information, command information, and a media file.

Each of the pieces of divided information obtained by dividing the predetermined information is inserted in the predetermined number of audio frames of the audio compressed data stream, and information indicating the overall size of the predetermined information is added to the first piece of divided information.

The control unit controls the decode processing and the information processing. In the decode processing, audio data is obtained by decoding the audio compressed data stream, and each of the pieces of divided information constituting the predetermined information is obtained from the predetermined number of audio frames on the basis of the information indicating the overall size of the predetermined information. In this case, it is possible to ensure space for the predetermined information in a storage medium on the basis of the information indicating the overall size of the predetermined information at a time point where the first piece of divided information is obtained. Then, the information processing performs processing using predetermined information obtained by the decode processing.

In this manner, according to the present technology, each of the pieces of divided information constituting the predetermined information is obtained from the predetermined number of audio frames on the basis of the information indicating the overall size of the predetermined information added to the first piece of divided information. In this case, when obtaining each of the pieces of divided information constituting the predetermined information from the predetermined number of audio frames, it is possible to ensure sufficient space for storing the predetermined information in a storage medium on the basis of the information indicating the overall size of the predetermined information at a time point where the first piece of divided information is obtained, and to easily and appropriately perform processing of obtaining the predetermined information.

Moreover, another concept of the present technology is a reception apparatus including:

a reception unit configured to receive a container of a predetermined format including an audio compressed data stream, and a control unit configured to control information insertion processing of inserting predetermined information into the audio compressed data stream and configured to control stream transmission processing of transmitting the audio compressed data stream into which the predetermined information in inserted to an external device via a digital interface.

In the present technology, the receiver receives a container of a predetermined format including the audio compressed data stream. The control unit controls the information insertion processing and the stream transmission processing. In the information insertion processing, predetermined information is inserted into the audio compressed data stream. In the stream transmission processing, an audio compressed data stream into which the predetermined information is inserted is transmitted to an external device via a digital interface.

For example, the predetermined information may be one of network access information, command information, and a media file. Moreover, for example, predetermined information may be inserted in a layer of the received container, and the information insertion processing may extract the predetermined information inserted in the layer of the container and may insert the extracted information into the audio compressed data stream.

In this manner, in the present technology, the audio compressed data stream into which predetermined information is inserted is transmitted to the external device via the digital interface. This makes it possible to satisfactorily transmit the predetermined information to the external device together with the audio compressed data stream.

Note that in the present technology, for example, the information insertion processing may be configure to enable each of the pieces of divided information obtained by dividing predetermined information to be inserted into a predetermined number of audio frames of the audio compressed data stream. In this case, for example, the information insertion processing may insert the divided information into a user data region of the audio frame. In this case, it is possible to suppress the size of information inserted in each of the audio frames even when the overall size of the predetermined information is large, and to satisfactorily transmit the predetermined information without affecting the transmission of the audio compressed data.

Moreover, in this case, for example, the information insertion processing may add information indicating the overall size of the predetermined information to the first piece of divided information, and may further add information indicating whether the information is the first piece of divided information and information indicating the divided position to each of the pieces of divided information. By adding information to each of the pieces of divided information in this manner it is possible to easily and appropriately perform the processing of obtaining the predetermined information.

Effects of the Invention

According to the present technology, it is possible on a receiving side to easily and appropriately perform processing of obtaining predetermined information in a case where the predetermined information is divided into a predetermined number of audio frames and transmitted. Note that effects described here in the present specification are provided for purposes of exemplary illustration and are not intended to be limiting. Still other additional effects may also be contemplated.

BRIEF DESCRIPTION OF DRAWINGS

FIG. 5 is a diagram illustrating a correspondence between types and values of extension elements.

FIG. 6 is a diagram illustrating an exemplary configuration of a universal metadata frame including universal metadata as an extension element.

FIG. 7 is a diagram illustrating an exemplary configuration of access information having predetermined information.

FIG. 8 is a diagram illustrating content of main information in a universal metadata frame and access information.

FIG. 9 is a diagram illustrating an exemplary case where container target data is transmitted with a plurality of universal metadata frames.

FIG. 19 is a diagram illustrating an exemplary structure of an application descriptor.

MODE FOR CARRYING OUT THE INVENTION

Hereinafter, embodiments of the present invention (hereinafter, embodiment(s)) will be described. Note that description will be presented in the following order.

1. Embodiment
2. Modification example

1. Embodiment

[Exemplary Configuration of Transmission-Reception System]

Figure 1:
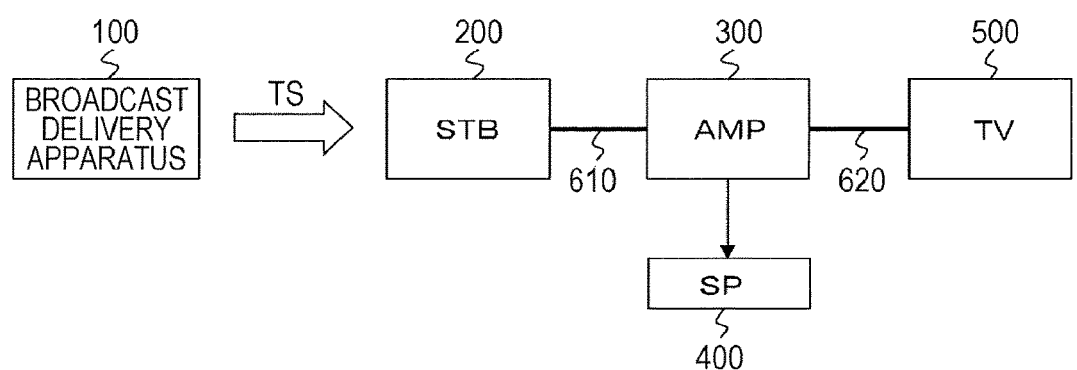
FIG. 1 is a block diagram illustrating an exemplary configuration of a transmission-reception system according to an embodiment.

FIG. 1 illustrates an exemplary configuration of a transmission-reception system 10 according to an embodiment. The transmission-reception system 10 includes a broadcast delivery apparatus 100, a set top box (STB) 200, an audio amplifier (AMP) 300, and a television receiver (TV) 500. A speaker system 400 for multi-channel is connected to the audio amplifier 300.

The set top box 200 and the audio amplifier 300 are connected with each other via an HDMI cable 610. In this case, the set top box 200 is a source and the audio amplifier 300 is a destination. Moreover, the audio amplifier 300 and the television receiver 500 are connected with each other via an HDMI cable 620. In this case, the audio amplifier 300 is the source and the television receiver 500 is the destination. Note that "HDMI" is a registered trademark.

The broadcast delivery apparatus 100 transmits a transport stream TS over broadcast waves. The transport stream TS includes a video stream and an audio stream (audio compressed data stream). The broadcast delivery apparatus 100 inserts, as container target data, predetermined information such as network access information, command information, and a media file into the audio stream.

For example, the network access information includes URL information for connecting to the link server. Moreover, for example, command information includes commands such as "start" and "pause". Moreover, for example, the media file includes a general data file such as character data, an audio data file, and an audio visual data file.

The broadcast delivery apparatus 100 divides predetermined information and inserts the divided information into a predetermined number of audio frames of the audio stream. By dividing in this manner, it is possible to suppress the size of information inserted in each of the audio frames even when the overall size of the predetermined information is large, and possible to transmit the predetermined information without affecting transmission of the audio compressed data.

At this time, the broadcast delivery apparatus 100 adds information indicating the overall size of the predetermined information to the first piece of divided information, and adds information indicating whether the information is the first piece of divided information and information indicating the divided position to each of the pieces of divided information. Note that the predetermined number includes one. When the predetermined number is one, the predetermined information is not actually divided but the overall information is inserted into one audio frame.

Figure 2:
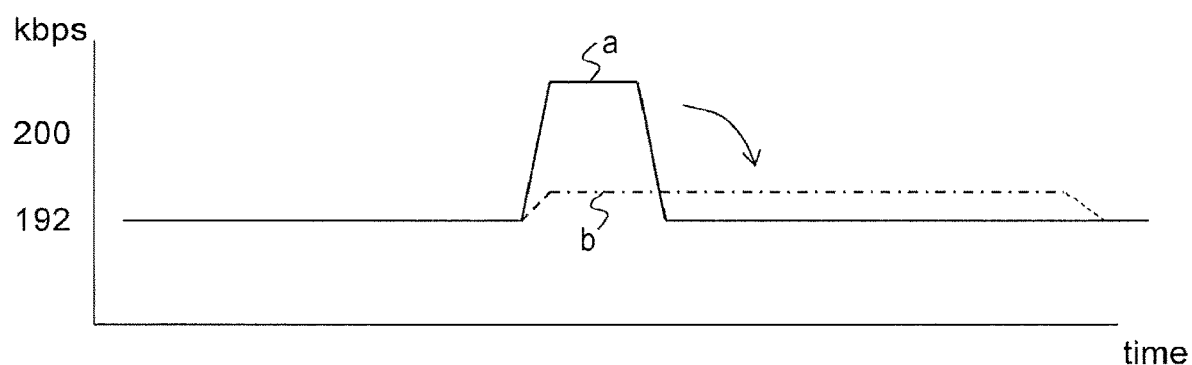
FIG. 2 is a diagram illustrating an effect obtained by dividing and transmitting predetermined information.

The solid line a in FIG. 2 schematically illustrates a change in bit rate in a case of transmitting predetermined information with a large overall size in one audio frame. In this case, the bit rate abruptly increases in the audio frame into which the predetermined information is inserted. In this case, for example, when the bit rate of the audio compressed data is 192 kbps and the predetermined information is 40 bytes, the bit rate increases by 15 kbps so as to be 207 kbps. An abruptly increase in the bit rate like a spike in this manner would affect the transmission of the audio compressed data.

Meanwhile, the broken line b in FIG. 2 schematically illustrates a change in the bit rate in the case of transmitting predetermined information with a large overall size divided in a plurality of audio frames. In this case, there would be no abrupt increase in the bit rate. This makes it possible to satisfactorily transmit predetermined information with a large overall size without affecting transmission of the audio compressed data.

The set top box 200 receives the transport stream TS transmitted over the broadcast waves from the broadcast delivery apparatus 100. As described above, the transport stream TS includes a video stream and an audio stream, and predetermined information is inserted in the audio stream.

The set top box 200 transmits the received audio stream itself to the audio amplifier 300 via the HDMI cable 610 together with uncompressed video data obtained by performing decode processing on the video stream. With this operation, predetermined information inserted in the audio stream is also transmitted to the audio amplifier 300.

The audio amplifier 300 receives an audio stream into which predetermined information is inserted together with the uncompressed video data from the set top box 200 via the HDMI cable 610. The audio amplifier 300 obtains audio data for multi-channel by performing decode processing on the audio stream and supplies the obtained audio data to the speaker system 400.

Moreover, the audio amplifier 300 transmits the received uncompressed video data and audio stream to the television receiver 500 via the HDMI cable 620. As a result, the predetermined information inserted in the audio stream is also transmitted to the television receiver 500.

The television receiver 500 receives the uncompressed video data and an audio stream into which predetermined information is inserted from the audio amplifier 300 via the HDMI cable 620. The television receiver 500 displays an image based on the uncompressed video data. Moreover, the television receiver 500 obtains predetermined information by performing decode processing on the audio stream.

The inserted predetermined information is divided into a predetermined number of audio frames of the audio stream. Information indicating the overall size of the predetermined information is added to the first piece of divided information, and information indicating whether the information is the first piece of divided information and information indicating the divided position are added to each of the pieces of divided information. On the basis of the information, the television receiver 500 obtains each of pieces of divided information constituting predetermined information from a predetermined number of audio frames.

In this case, the television receiver 500 recognizes the information indicating the overall size of the predetermined information at a time point where the first piece of divided information is obtained. This also enables television receiver 500 to ensure space for storing predetermined information in the storage medium and to easily and appropriately perform processing of obtaining predetermined information.

The television receiver 500 performs information processing using predetermined information. For example, in a case where the predetermined information is network access information, the television receiver 500 accesses a predetermined server on a network. Moreover, for example, in a case where the predetermined information is a group of commands, the television receiver 500 controls operation of the predetermined server accessed or performs control such as reproduction of a media file.

[Stream Generation Unit of Broadcast Delivery Apparatus]

Figure 3:
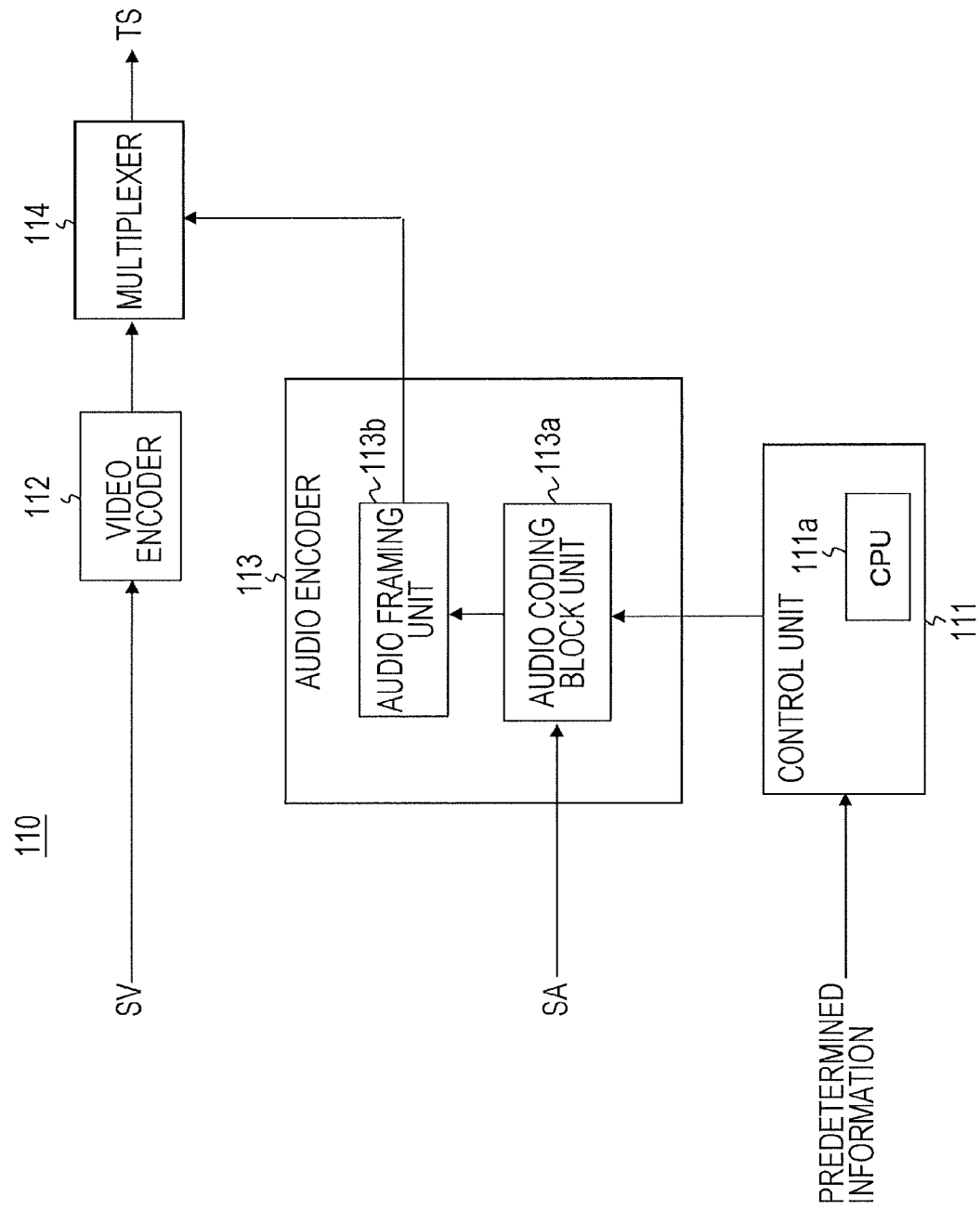
FIG. 3 is a block diagram illustrating an exemplary configuration of a stream generation unit of a broadcast delivery apparatus.

FIG. 3 illustrates an exemplary configuration of a stream generation unit 110 of the broadcast delivery apparatus 100.

The stream generation unit 110 includes a control unit 111, a video encoder 112, an audio encoder 113, and a multiplexer 114.

The control unit 111 includes a CPU 111*a* and controls each of portions of the stream generation unit 110. The video encoder 112 generates a video stream (video elementary stream) by performing coding such as MPEG 2, H.264/AVC, H.265/HEVC on video data (image data) SV. The video data SV is, for example, video data reproduced from a recording medium such as a hard disk drive (HDD), live video data obtained by a video camera, or the like.

The audio encoder 113 performs coding using a compression format of MPEG-H 3D Audio on audio data (sound data) SA and generates an audio stream (audio elementary stream). The audio data SA corresponds to the above-described video data SV, and includes audio data reproduced from a recording medium such as an HDD, live audio data obtained by a microphone.

The audio encoder 113 includes an audio coding block unit 113*a* and an audio framing unit 113*b*. A coding block is generated in the audio coding block unit 113*a*, and framing is performed in the audio framing unit 113*b*.

Under the control of the control unit 111, the audio encoder 113 inserts predetermined information into the audio stream. In this embodiment, the predetermined information is network access information, command information, a media file, for example.

The audio encoder 113 divides and inserts predetermined information into a predetermined number (including one) of audio frames of an audio stream. At this time, the audio encoder 113 adds information indicating the overall size of the predetermined information to the first piece of divided information. Moreover, the audio encoder 113 adds information indicating whether the divided information is the first piece of divided information, and adds counts in descending order as information indicating the divided position to each of the pieces of divided information.

Figure 4:
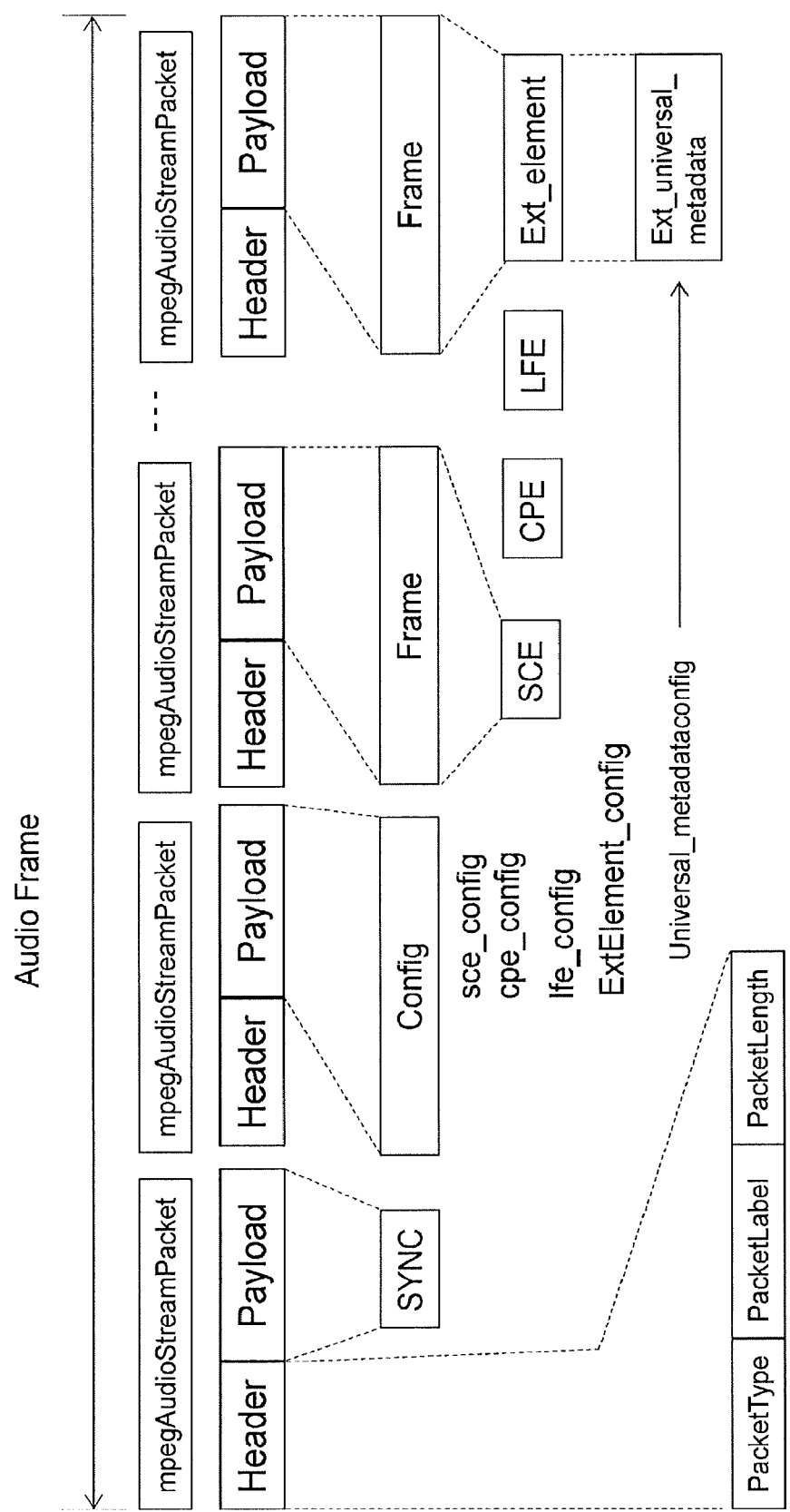
FIG. 4 is a diagram illustrating an exemplary structure of an audio frame in transmission data of MPEG-H 3D Audio.

FIG. 4 illustrates an exemplary structure of an audio frame in transmission data of MPEG-H 3D Audio. This audio frame is formed of a plurality of MPEG audio stream packets (mpeg Audio Stream Packet). Each of the MPEG audio stream packets is formed with a header (Header) and a payload (Payload).

The header has information such as a packet type (Packet Type), a packet label (Packet Label), and a packet length (Packet Length). The information defined by the packet type of the header is arranged in the payload. The information in the payload includes "SYNC" corresponding to a synchronization start code, "Frame" which is actual data of the 3D audio transmission data, and "Config" indicating the configuration of "Frame".

"Frame" includes channel-coded data and object coded data constituting transmission data of 3D audio. Here, the channel-coded data is formed of encoded sample data such as a single channel element (SCE), a channel pair element (CPE), and a low frequency element (LFE). Moreover, the object coded data is formed of encoded sample data of single channel element (SCE) and metadata for rendering the sample data by performing mapping to a speaker located at an arbitrary position. This metadata is included as an extension element (Ext_element).

In the present embodiment, an element (Ext_universal_metadata) having predetermined information such as network access information, command information, and a media file as universal metadata (universal_metadata) is newly defined as the extension element (Ext_element).

Along with this, configuration information (universal_metadataConfig) of the element is newly defined in "Config".

FIG. 5 illustrates the correspondence between the type (ExElementType) and the value (Value) of the extension element (Ext_element). Currently, 0 to 7 are determined. Values of 128 and higher can be expanded to other than MPEG, for example, and thus, 128 is newly defined as a value of a type "ID_EXT_ELE_universal_metadata". Note that in a case of standards such as MPEG, it is also possible to define with 8 to 127.

FIG. 6 illustrates an exemplary configuration (syntax) of a universal metadata frame (universal_metadata_frame ( )) including universal metadata as an extension element. FIG. 7 illustrates an exemplary configuration (syntax) of access information (Access_information ( )) inserted into "bytes_to_carry_access_information" of a predetermined number (including one) of universal metadata frames. FIG. 8 illustrates the content (semantics) of main information in each of the exemplary configurations.

A 32-bit field of "organization_id" indicates a target of the applicable standard. The 8-bit field of "metadata_type" indicates the type of metadata. For example, "0x10" indicates universal metadata of the MPEG-H format. The 8-bit field of "data_id" indicates an identifier of the container target data. An identical identifier is assigned to each of the pieces of divided information obtained by dividing the same container target data.

A 1-bit field of "start_flag" indicates whether it is a start of the container target data. "1" indicates start, "0" indicates non-start. The 7-bit field of "fcounter" indicates the divided position of the divided container target data by the counts in descending order. "0" indicates the last divided portion. The case where "start_flag" is "1" and "fcounter" is "0" indicates that the data is the target data that is not divided.

When "start_flag" is "1", there exists a 16-bit field of "total_data_size". This field indicates the size of the container target data. The whole or a portion (divided information) of the access information (Access_information ( )) is inserted into the "bytes_to_carry_access_information" field.

The 8-bit field of "information_type" indicates the type of container target data. For example, "0x01" indicates URL information, "0x02" indicates a command group, and "0x03" indicates a media file. The 16-bit field of "information_length" indicates the size of container target data starting from the next element, having the same value as the 16-bit field of "total_data_size" described above.

Returning to FIG. 3, the multiplexer 114 performs PES packetization on the video stream output from the video encoder 112 and on the audio stream output from the audio encoder 113, further multiplexes the streams by transport packetization, thereby obtaining a transport stream TS as a multiplexed stream.

Operation of the stream generation unit 110 illustrated in FIG. 3 will be briefly described. The video data SV is supplied to the video encoder 112. The video encoder 112 generates a video stream including coding video data by performing coding such as H.264/AVC and H.265/HEVC on the video data SV.

The audio data SA is also supplied to the audio encoder 113. The audio encoder 113 performs coding on the audio data SA with the compression format of MPEG-H 3D Audio, thereby generating an audio stream (audio compressed data stream).

At this time, the control unit 111 supplies predetermined information (network access information, command information, a media file, or the like) to be inserted into the audio stream, that is, container target data to the audio encoder 113. The audio encoder 113 inserts divided container target data (predetermined information) into a predetermined number (including one) of audio frames of the audio streams.

At this time, the audio encoder 113 adds information indicating the overall size of predetermined information (container target data) to the first piece of divided information. Moreover, the audio encoder 113 adds information indicating whether the divided information is the first piece of divided information and adds counts in descending order as information indicating the divided position to each of the pieces of divided information.

The video stream generated by the video encoder 112 is supplied to the multiplexer 114. Moreover, the audio stream generated by the audio encoder 113 is supplied to the multiplexer 114. Subsequently, the multiplexer 114 packetizes and multiplexes the streams supplied from the individual encoders, thereby obtaining the transport stream TS as transmission data.

[Inserting Container Target Data (Predetermined Information)]

Insertion of container target data into an audio stream will be further described. FIG. 9 illustrates an exemplary case where the container target data (predetermined information) is transmitted with a plurality of universal metadata frames.

In this case, the container target data is divided into a plurality of pieces of data, each of the plurality of pieces of divided information is allocated to a plurality of universal metadata frames and inserted into the field of "bytes_to_carry_access_information" (refer to FIG. 6). Note that "start_flag" corresponding to the first piece of divided information is set to "1", indicating that it is the first piece of divided information. Moreover, "fcounter" corresponding to the first piece of divided information is set to "n−1", and the number of divisions "n" is indicated by adding one to the value. Moreover, corresponding to this first piece of divided information, there exists a field of "total_data_size", indicating the overall size of the container target data (predetermined information).

"Start_flag" corresponding to the second and subsequent pieces of divided information is set to "0", indicating that it is not the first piece of divided information. Moreover, "fcounter" corresponding to the second and subsequent pieces of divided information indicates counts sequentially decremented from "n−1", indicating the divided position and the number of remaining pieces of divided information. Moreover, "fcounter" corresponding to the last piece of divided information is set to "0", indicating that it is the last piece of divided information.

Note that it is conceivable to set "fcounter" corresponding to the first piece of divided information to "n", set "fcounter" corresponding to the second and subsequent pieces of divided information to indicate counts sequentially decremented from "n", and to set "fcounter" corresponding to the last piece of divided information to "1". "n" of "fcounter" corresponding to the first piece of divided information indicates the number of divisions, and "fcounter" of "1" indicates that it is the last piece of divided information.

Figure 10:
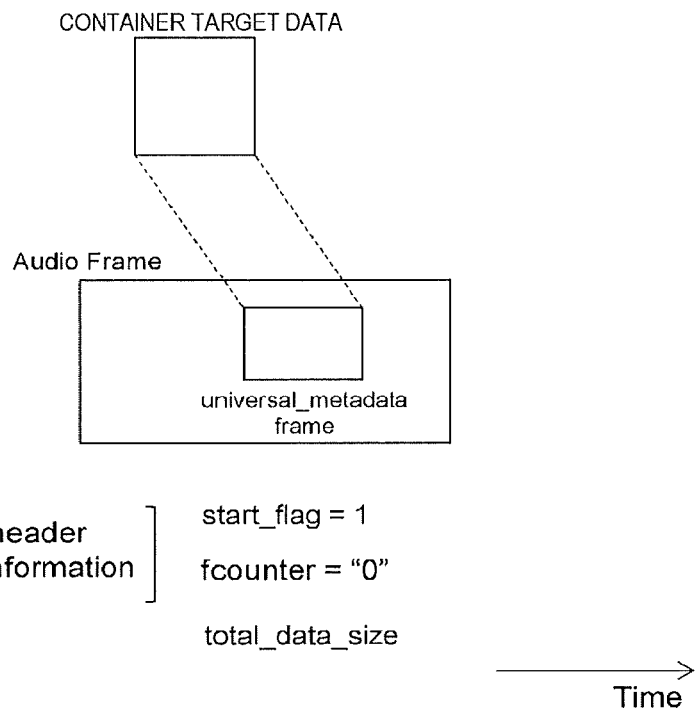
FIG. 10 is a diagram illustrating an exemplary case where container target data is transmitted with one universal metadata frame.

FIG. 10 illustrates an exemplary case where container target data (predetermined information) is transmitted with one universal metadata frame. In this case, the container target data is not divided and is inserted into the field of "bytes_to_carry_access_information" of one universal metadata frame (refer to FIG. 6). Here, "start_flag" is set to "1", indicating that it is the first piece of divided information. Moreover, "fcounter" is set to "0", indicating that it is the last piece of divided information. Therefore, from these pieces of information, it is indicated that this container target data is not divided. Moreover, corresponding to this first piece of divided information, there exists a field of "total_data_size", indicating the overall size of the container target data (predetermined information).

Figure 11:
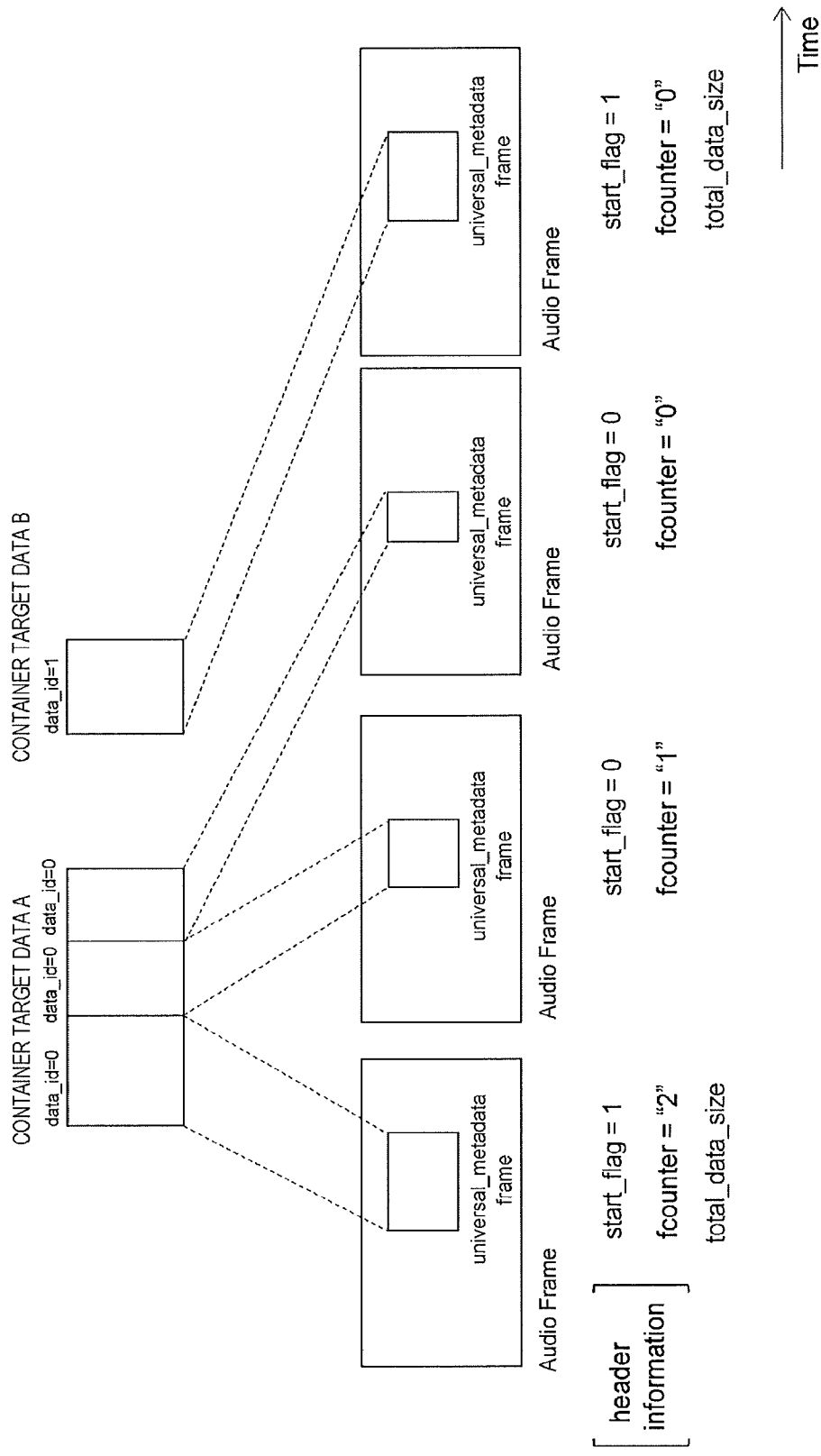
FIG. 11 is a diagram illustrating an exemplary case where a plurality of pieces of container target data is transmitted with a plurality of universal metadata frames.

FIG. 11 illustrates an exemplary case where a plurality of pieces of container target data (predetermined information) is transmitted with a plurality of universal metadata frames. The exemplary case illustrated in the figure is a case of transmitting two pieces of container target data, that is, container target data A having "data_id" indicated by "0" and container target data B having "data_id" of "1".

In this case, the container target data A is divided into three pieces, each of the three pieces of divided information is allocated to three universal metadata frames, and inserted into the field of "bytes_to_carry_access_information" (refer to FIG. 6). Note that "start_flag" corresponding to the first piece of divided information is set to "1", indicating that it is the first piece of divided information. Moreover, "fcounter" corresponding to the first piece of divided information is set to "2", and the number of divisions "3" is indicated by adding one to the value. Moreover, corresponding to this first piece of divided information, there exists a field of "total_data_size", indicating the overall size of the container target data (predetermined information).

"Start_flag" corresponding to the second piece of divided information is set to "0", indicating that it is not the first piece of divided information. Moreover, "fcounter" corresponding to the second piece of divided information is set to "1", indicating the divided position and indicating that the number of remaining divided pieces of information is "1". Moreover, "start_flag" corresponding to the last piece of divided information is set to "0", indicating that it is not the last piece of divided information. Then, "fcounter" corresponding to the last piece of divided information is set to "0", indicating that it is the last piece of divided information.

Moreover, the container target data B is not divided and is inserted into the field of "bytes_to_carry_access_information" of one universal metadata frame (refer to FIG. 6). Here, "start_flag" is set to "1", indicating that it is the first piece of divided information. Moreover, "fcounter" is set to "0", indicating that it is the last piece of divided information. Therefore, from these pieces of information, it is indicated that this container target data is not divided. Moreover, corresponding to this first piece of divided information, there exists a field of "total_data_size", indicating the overall size of the container target data (predetermined information).

[Exemplary Structure of Transport Stream TS]

Figure 12:
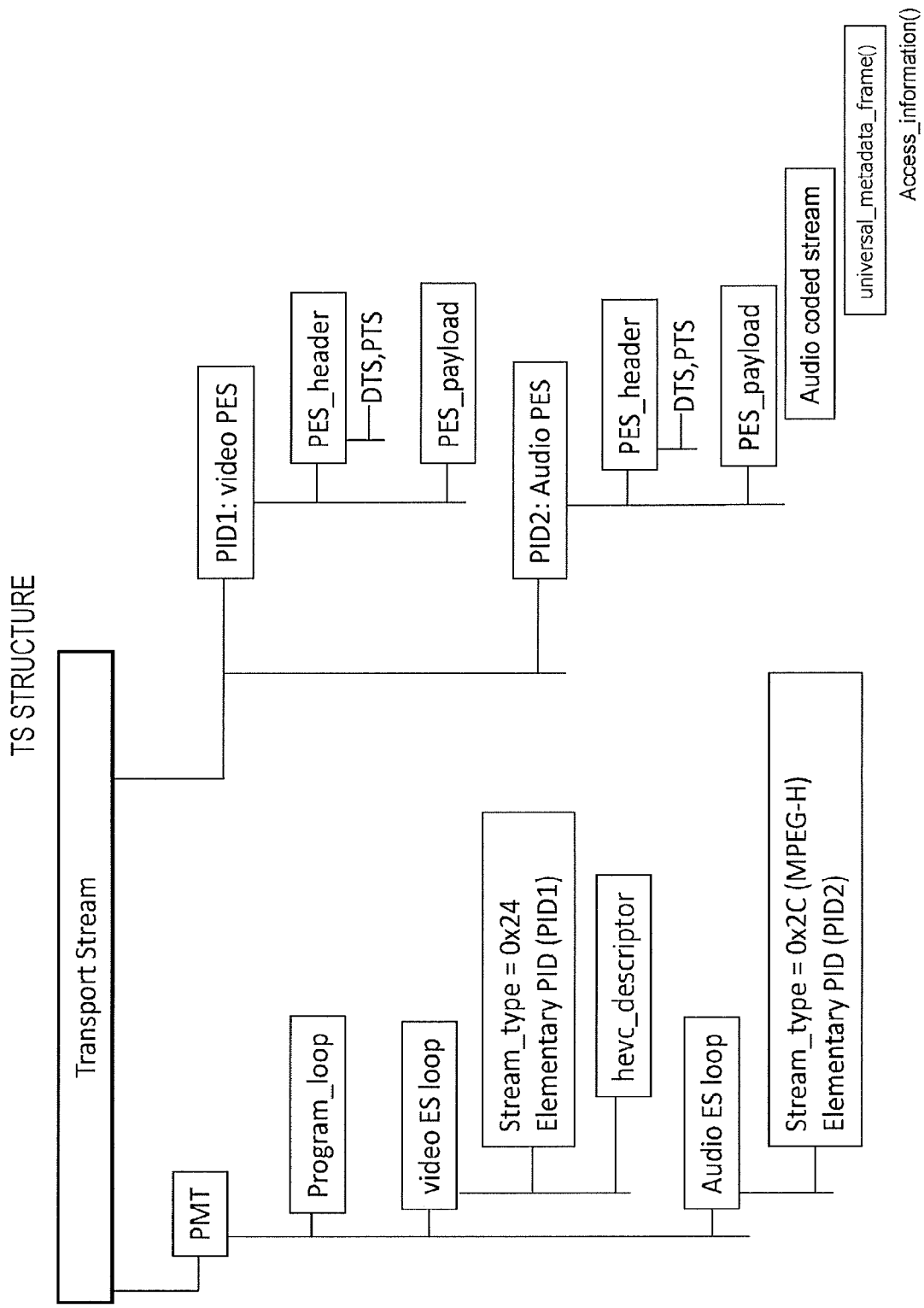
FIG. 12 is a diagram illustrating an exemplary structure of a transport stream TS in the case of transmitting predetermined information (container target data) inserted into an audio stream.

FIG. 12 illustrates an exemplary structure of the transport stream TS. In this exemplary structure, there exists a PES packet "video PES" of the video stream identified by PID1, and there exists a PES packet "audio PES" of the audio stream identified by PID2. The PES packet is formed with a PES header (PES_header) and a PES payload (PES_payload). In the PES header, time stamps of DTS and PTS are inserted.

An audio stream (Audio coded stream) is inserted into the PES payload of the PES packet of the audio stream. Access information (Access_information ( )) including predetermined information (container target data) is inserted into a universal metadata frame (universal_metadata_frame ( )) of a predetermined number (including one) of audio frames of the audio stream.

Moreover, the transport stream TS includes a program map table (PMT) as program specific information (PSI). The PSI is information describing each of elementary streams included in the transport stream belongs to which program. The PMT includes a program loop (Program loop) that describes information related to the overall program.

Moreover, PMT includes an elementary stream loop having information related to each of the elementary streams. In this exemplary configuration, there exists a video elementary stream loop (video ES loop) corresponding to the video stream, and there exists an audio elementary stream loop (audio ES loop) corresponding to the audio stream.

Information such as a stream type and a packet identifier (PID) is arranged, and together with this, a descriptor describing information related to the video stream is arranged in the video elementary stream loop (video ES loop) corresponding to the video stream. The value of "Stream_type" of this video stream is set to "0x24", and the PID information indicates PID1 added to the PES packet "video PES" of the video stream as described above. An HEVC descriptor is arranged as one of the descriptors.

Moreover, information such as a stream type and a packet identifier (PID) is arranged, and together with this, a descriptor describing information related to the audio stream is arranged in the audio elementary stream loop (audio ES loop) corresponding to the audio stream. The value of "Stream_type" of this audio stream is set to "0x2C", and the PID information indicates PID2 to be added to the PES packet "audio PES" of the audio stream as described above.

[Exemplary Configuration of Set Top Box]

Figure 13:
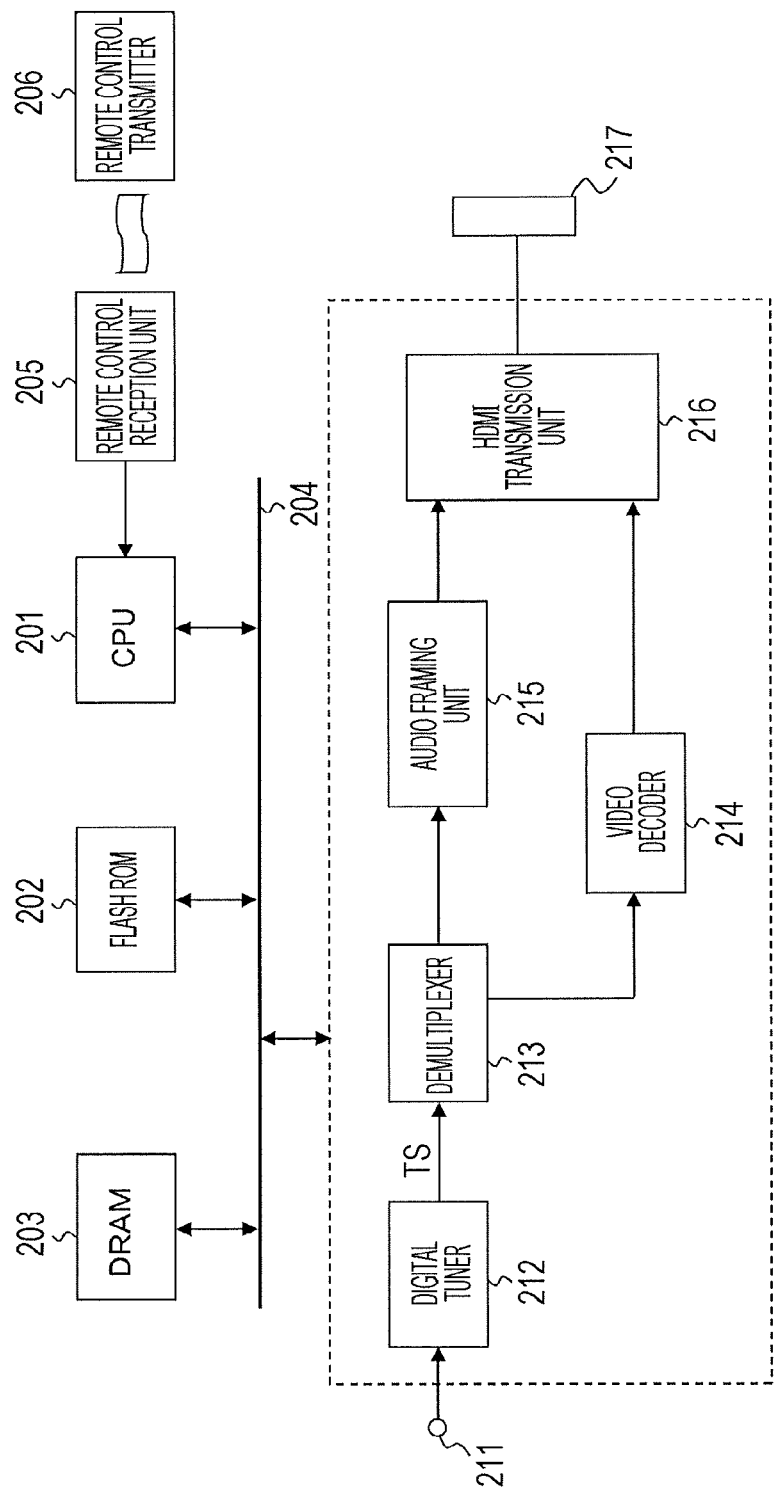
FIG. 13 is a block diagram illustrating an exemplary configuration of a set top box.

FIG. 13 illustrates an exemplary configuration of the set top box 200. The set top box 200 includes a CPU 201, a flash ROM 202, a DRAM 203, an internal bus 204, a remote control reception unit 205, and a remote control transmitter 206. Moreover, the set top box 200 includes an antenna terminal 211, a digital tuner 212, a demultiplexer 213, a video decoder 214, an audio framing unit 215, an HDMI transmission unit 216, and an HDMI terminal 217.

The CPU 201 controls operation of each of portions of the set top box 200. The flash ROM 202 stores control software and data. The DRAM 203 constitutes a work area of the CPU 201. The CPU 201 develops software and data read from the flash ROM 202 onto the DRAM 203 to start the software, and controls each of portions of the set top box 200.

The remote control reception unit 205 receives a remote control signal (remote control code) transmitted from the remote control transmitter 206, and supplies the received signal to the CPU 201. The CPU 201 controls each of portions of the set top box 200 on the basis of this remote control code. The CPU 201, the flash ROM 202, and the DRAM 203 are connected to the internal bus 204.

The antenna terminal 211 is a terminal for inputting a television broadcast signal received by a reception antenna (not illustrated). The digital tuner 212 processes the television broadcast signal input into the antenna terminal 211 and outputs the transport stream TS corresponding to the channel selected by the user.

The demultiplexer 213 extracts a packet of the video stream from the transport stream TS and transmits the packet to the video decoder 214. The video decoder 214 reconstructs the video stream from the video packet extracted by the demultiplexer 213, and performs decode processing, thereby obtaining uncompressed video data (image data).

Moreover, the demultiplexer 213 extracts a packet of the audio stream from the transport stream TS, and reconstructs the audio stream. The audio framing unit 215 performs framing on the audio stream reconstructed in this manner. In this audio stream, predetermined information (container target data) such as network access information, command information, and a media file is inserted as described for the stream generation unit 110 (refer to FIG. 3).

The HDMI transmission unit 216 transmits the uncompressed video data obtained by the video decoder 214 and the audio stream framed by the audio framing unit 215 from the HDMI terminal 217 by communication conforming to HDMI. In order to transmit on the TMDS channel of HDMI, the HDMI transmission unit 216 packs the video data and the audio stream and outputs the packed data to the HDMI terminal 217. Details of the HDMI transmission unit 216 will be described below.

Operation of the set top box 200 will be briefly described. The television broadcast signal input into the antenna terminal 211 is supplied to the digital tuner 212. The digital tuner 212 processes the television broadcast signal and outputs a transport stream TS corresponding to the channel selected by the user.

The transport stream TS output from the digital tuner 212 is supplied to the demultiplexer 213. The demultiplexer 213 extracts packets of video elementary streams from the transport stream TS and transmits the packet to the video decoder 214.

The video decoder 214 reconstructs the video stream from the video packets extracted by the demultiplexer 213, and thereafter, performs decode processing on the video stream, thereby obtaining uncompressed video data. The uncompressed video data is supplied to the HDMI transmission unit 216.

Moreover, the demultiplexer 213 extracts a packet of the audio stream from the transport stream TS, and reconstructs an audio stream into which predetermined information (container target data) such as network access information, command information, and a media file is inserted. This audio stream is framed by the audio framing unit 215 and then supplied to the HDMI transmission unit 216. Subsequently, the HDMI transmission unit 216 packs the uncompressed video data and audio stream, and transmits the packed data from the HDMI terminal 217 to the audio amplifier 300 via the HDMI cable 610.

[Exemplary Configuration of Audio Amplifier]

Figure 14:
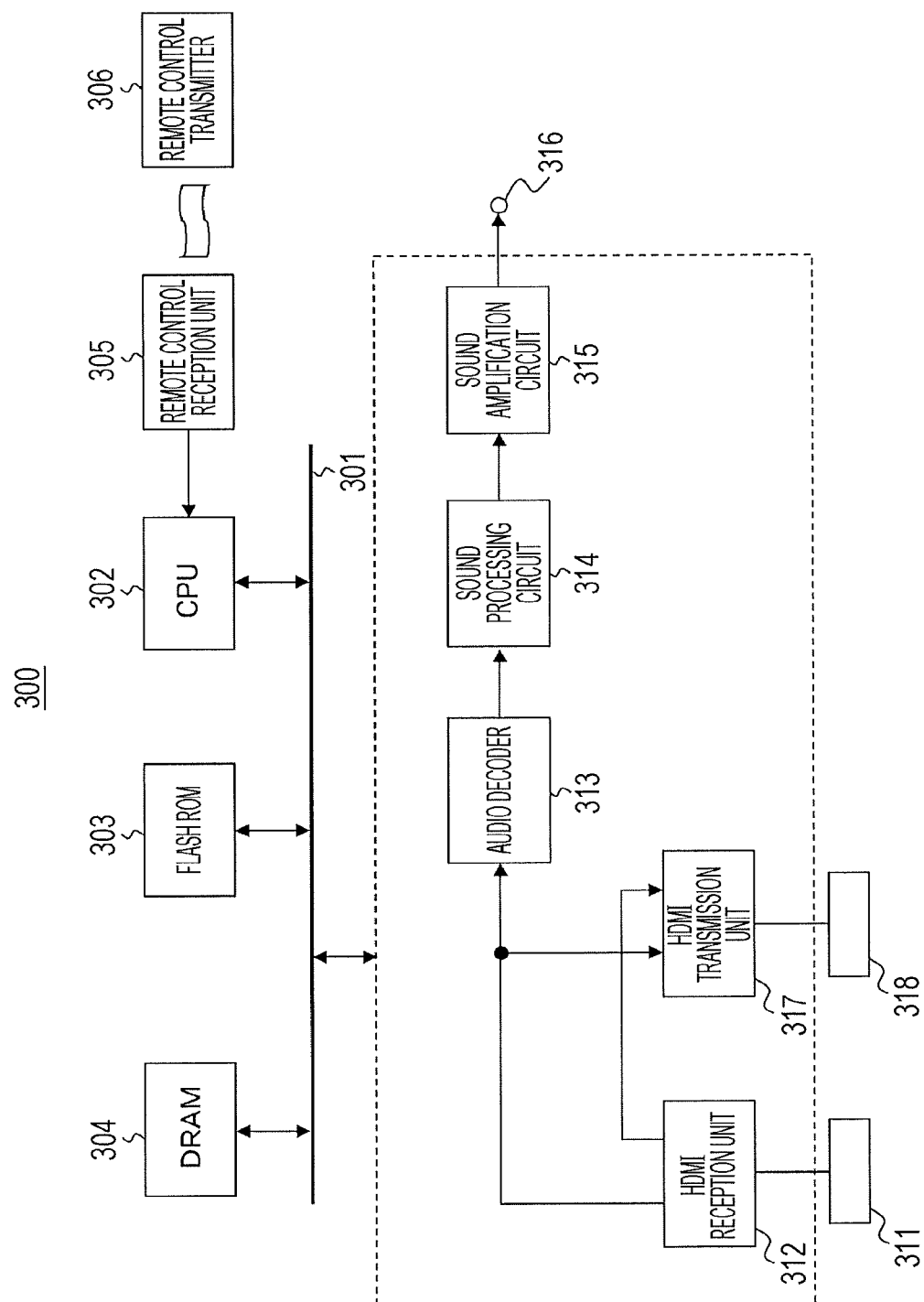
FIG. 14 is a block diagram illustrating an exemplary configuration of an audio amplifier.

FIG. 14 illustrates an exemplary configuration of the audio amplifier 300. The audio amplifier 300 includes a CPU 301, a flash ROM 302, a DRAM 303, an internal bus 304, a remote control reception unit 305, and a remote control transmitter 306. Moreover, the audio amplifier 300 includes an HDMI terminal 311, an HDMI reception unit 312, an audio decoder 313, a sound processing circuit 314, a sound amplification circuit 315, a sound output terminal 316, an HDMI transmission unit 317, an HDMI terminal 318.

The CPU 301 controls the operation of each of portions of the audio amplifier 300. The flash ROM 302 stores control software and data. The DRAM 303 constitutes a work area of the CPU 301. The CPU 301 develops the software and data read from the flash ROM 302 onto the DRAM 303 to start the software, and controls each of portions of the audio amplifier 300.

The remote control reception unit 305 receives a remote control signal (remote control code) transmitted from the remote control transmitter 306, and supplies the received signal to the CPU 301. The CPU 301 controls each of portions of the audio amplifier 300 on the basis of this remote control code. The CPU 301, the flash ROM 302, and the DRAM 303 are connected to the internal bus 304.

The HDMI reception unit 312 receives uncompressed video data and audio stream supplied to the HDMI terminal 311 via the HDMI cable 610 by communication conforming to HDMI. In this audio stream, predetermined information (container target data) such as network access information, command information, and a media file is inserted as described for the set top box 200 (refer to FIG. 13). Details of the HDMI reception unit 312 will be described below.

The audio decoder 313 performs decode processing on the audio stream received by the HDMI reception unit 212, thereby obtaining uncompressed audio data (sound data) of a predetermined number of channels. On the uncompressed audio data of a predetermined number of channels, the sound processing circuit 314 performs necessary up-down mix processing in accordance with the configuration of the speaker system 400 (refer to FIG. 1), resulting in acquisition of audio data of the necessary number of channels, and executes necessary processing such as D/A conversion.

The sound amplification circuit 315 amplifies the audio signal of each of the channels obtained by the sound processing circuit 314 and outputs the amplified signal to the audio output terminal 316. Note that the speaker system 400 is connected to the audio output terminal 316.

The HDMI transmission unit 317 transmits the uncompressed video data and the audio stream received on the HDMI reception unit 212 from the HDMI terminal 318 via communication conforming to HDMI. In order to transmit on the TMDS channel of HDMI, the HDMI transmission unit 317 packs the uncompressed video data and the audio stream and outputs the packed data to the HDMI terminal 318. Details of the HDMI transmission unit 317 will be described below.

Operation of the audio amplifier 300 illustrated in FIG. 14 will be briefly described. The HDMI reception unit 312 receives the uncompressed video data and audio stream transmitted from the set top box 200 to the HDMI terminal 311 via the HDMI cable 610.

The audio stream received by the HDMI reception unit 312 is supplied to the audio decoder 313. The audio decoder 313 performs decode processing on the audio stream, thereby obtaining uncompressed audio data with a predetermined number of channels. This audio data is supplied to the sound processing circuit 314.

In the sound processing circuit 314, necessary up-down mix processing on the uncompressed audio data of a predetermined number of channels is performed in accordance with the configuration of the speaker system 400 (refer to FIG. 1), resulting in acquisition of audio data of the necessary number of channels and execution of necessary processing such as D/A conversion. Audio data of each of the channels output from the sound processing circuit 314 is amplified by the audio amplification circuit 315 and output to the audio output terminal 316. With this configuration, a sound output of a predetermined number of channels is obtained from the speaker system 400 connected to the sound output terminal 316.

Moreover, the uncompressed video data and audio stream received by the HDMI reception unit 312 are supplied to the HDMI transmission unit 317. Note that it is allowable to supply video data obtained by performing processing such as superimposition of graphics data on the uncompressed video data to the HDMI transmission unit 317 instead of the original non-compressed video data received by the HDMI reception unit 312. In the HDMI transmission unit 317 packs the uncompressed video data and audio streams and transmits the packed data from the HDMI terminal 318 to the television receiver 500 via the HDMI cable 620.

[Exemplary Configuration of Television Receiver]

Figure 15:
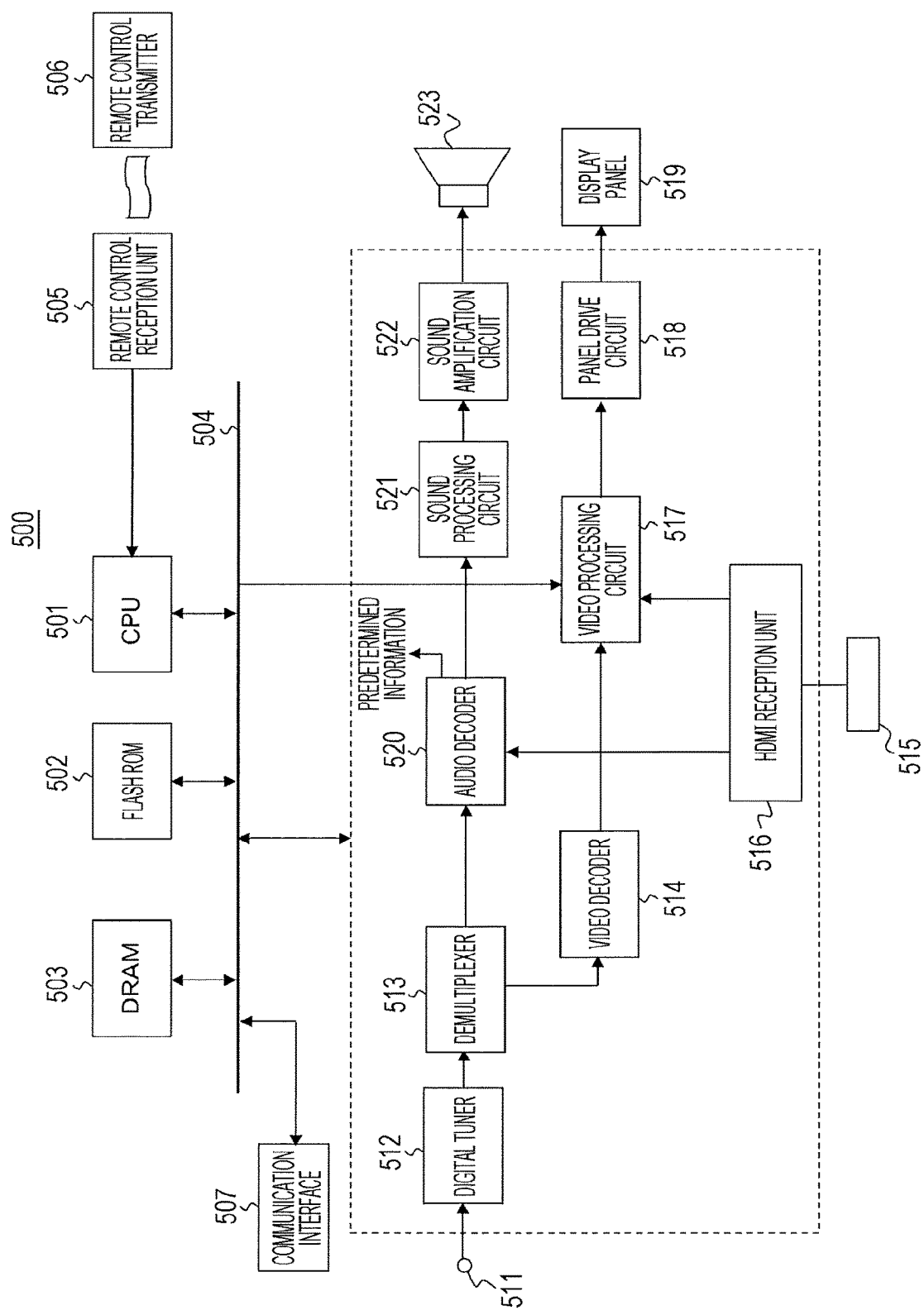
FIG. 15 is a diagram illustrating an exemplary configuration of a television receiver.

FIG. 15 illustrates an exemplary configuration of a television receiver 500. The television receiver 400 includes a CPU 501, a flash ROM 502, a DRAM 503, an internal bus 504, a remote control reception unit 505, a remote control transmission device 506, and a communication interface 507.

Moreover, the television receiver 500 includes an antenna terminal 511, a digital tuner 512, a demultiplexer 513, a video decoder 514, an HDMI terminal 515, and an HDMI reception unit 516. Moreover, the television receiver 500 includes a video processing circuit 517, a panel drive circuit 518, a display panel 519, an audio decoder 520, a sound processing circuit 521, a sound amplification circuit 522, and a speaker 523.

The CPU 501 controls operation of each of portions of the television receiver 500. The flash ROM 502 stores control software and data. The DRAM 503 constitutes a work area of the CPU 501. The CPU 501 develops the software and data read from the flash ROM 502 onto the DRAM 503 to start the software, and controls each of portions of the television receiver 500.

The remote control reception unit 505 receives a remote control signal (remote control code) transmitted from the remote control transmitter 506, and supplies the received signal to the CPU 501. The CPU 501 controls each of portions of the television receiver 500 on the basis of this remote control code. The CPU 501, the flash ROM 502, and the DRAM 503 are connected to the internal bus 504.

Under the control of the CPU 501, the communication interface 507 communicates with a server located on a network such as the Internet. The communication interface 507 is connected to the internal bus 504.

The antenna terminal 511 is a terminal for inputting a television broadcast signal received by a reception antenna (not illustrated). The digital tuner 512 processes the television broadcast signal input into the antenna terminal 511 and outputs the transport stream TS corresponding to the channel selected by the user.

The demultiplexer 513 extracts a packet of the video stream from the transport stream TS and transmits the packet to the video decoder 514. The video decoder 514 reconstructs the video stream from the video packet extracted by the demultiplexer 513, and performs decode processing, thereby obtaining uncompressed video data (image data).

Moreover, the demultiplexer 513 extracts a packet of the audio stream from the transport stream TS, and reconstructs the audio stream. In this audio stream, predetermined information (container target data) such as network access information, command information, and a media file is inserted as described for the stream generation unit 110 (refer to FIG. 3).

The HDMI reception unit 516 receives uncompressed video data and an audio stream supplied to the HDMI terminal 515 via the HDMI cable 620 by communication conforming to HDMI. In this audio stream, predetermined information (container target data) such as network access information, command information, and a media file is inserted as described for the audio amplifier 300 (refer to FIG. 14). Details of the HDMI reception unit 516 will be described below.

The video processing circuit 517 obtains video data for display by performing scaling processing, combining processing, or the like, on the video data obtained by the video decoder 514, video data obtained by the HDMI reception unit 516, video data received from a server on a net via the communication interface 507, or the like.

The panel drive circuit 518 drives the display panel 519 on the basis of the image data for display obtained by the video processing circuit 517. The display panel 519 includes a liquid crystal display (LCD), an organic electroluminescence (EL) display, for example.

The audio decoder 520 obtains uncompressed audio data (sound data) by performing decode processing on the audio stream obtained by the demultiplexer 513 or obtained by the HDMI reception unit 516. Moreover, the audio decoder 520 extracts predetermined information (container target data) such as network access information, command information, and a media file inserted in the audio stream, and transmits the extracted information to the CPU 501. The CPU 501 appropriately causes each of portions of the television receiver 500 to perform information processing using this predetermined information.

Note that the predetermined information is inserted in a state of being divided into a predetermined number (including 1) of audio frames of the audio stream, and information indicating the overall size of the predetermined information is added to the first piece of divided information, and the counts in descending order as information indicating whether the information is the first piece of divided information and information indicating the divided position are added to each of the pieces of divided information. On the basis of these pieces of information, the audio decoder 520 obtains each of pieces of divided information constituting predetermined information from a predetermined number of audio frames.

In this case, the audio decoder 520 can recognize the first piece of divided information from the information indicating whether it is the first piece of divided information, and recognize the number of divisions from the counts in descending order corresponding to the first piece of divided information, and further recognize the number of pieces of remaining divided information from the counts in descending order. This enables the audio decoder 520 to easily and appropriately obtain each of the pieces of divided information constituting the predetermined information from the predetermined number of audio frames.

Moreover, by the counts in descending order, (1) it is possible on the receiving side to detect a transmission packet error occurring in the middle of transmission, and (2) it is also possible to know approximate arrival time for the divided final packet in advance on the receiving side.

Moreover, since information indicating the overall size of the predetermined information has been added to the first piece of divided information, it is possible to ensure sufficient space for storing the predetermined information in a memory (storage medium) on the basis of the information indicating the overall size of the predetermined information at a time point where the first piece of divided information is obtained, enabling easily and appropriately processing of obtaining the predetermined information.

The CPU 501 appropriately causes each of portions of the television receiver 500 to perform information processing using this predetermined information. For example, in a case where the predetermined information is network access information, the television receiver 500 accesses a predetermined server on a network and obtains predetermined media information and performs processing of obtaining predetermined media information. Moreover, for example, in a case where the predetermined information is a media file, the television receiver 500 performs reproduction processing of the media file.

The sound processing circuit 521 performs necessary processing such as D/A conversion on the audio data obtained by the audio decoder 520. The sound amplification circuit 522 amplifies the sound signal output from the sound processing circuit 521 and supplies the amplified signal to the speaker 523.

Operation of the television receiver 500 illustrated in FIG. 15 will be briefly described. The television broadcast signal input into the antenna terminal 511 is supplied to the digital tuner 512. The digital tuner 512 processes the television broadcast signal and obtains a transport stream TS corresponding to the channel selected by the user.

The transport stream TS obtained by the digital tuner 512 is supplied to the demultiplexer 513. The demultiplexer 513 extracts a packet of the video stream from the transport stream TS and supplies the packet to the video decoder 514. The video decoder 514 reconstructs the video stream from the video packets extracted by the demultiplexer 513, and thereafter, performs decode processing on the video stream, thereby obtaining uncompressed video data. The uncompressed video data is supplied to the video processing circuit 517.

Moreover, the demultiplexer 513 extracts a packet of the audio stream from the transport stream TS, thereby reconstructing the audio stream. This audio stream is supplied to the audio decoder 520.

The HDMI reception unit 516 receives uncompressed video data and audio stream supplied to the HDMI terminal 515 by communication conforming to HDMI via the HDMI cable 620. The uncompressed video data is supplied to the video processing circuit 517. Moreover, the audio stream is supplied to the audio decoder 520.

The video processing circuit 517 obtains video data for display by performing scaling processing, combining processing, or the like, on video data obtained by the video decoder 514, video data obtained by the HDMI reception unit 516, video data received from a server on the net via the communication interface 507, or the like.

The video data for display obtained by the video processing circuit 517 is supplied to the panel drive circuit 518. The panel drive circuit 518 drives the display panel 519 on the basis of the video data for display. With this operation, an image corresponding to the video data for display is displayed on the display panel 519.

The audio decoder 520 obtains uncompressed audio data by performing decode processing on the audio stream obtained by the demultiplexer 513 or obtained by the HDMI reception unit 516. The audio data obtained by the audio decoder 520 is supplied to the sound processing circuit 521. The sound processing circuit 521 performs necessary processing such as D/A conversion on the audio data. This audio data is amplified by the sound amplification circuit 522 and then supplied to the speaker 523. Accordingly, a sound corresponding to the display image of the display panel 519 is output from the speaker 523.

Moreover, the audio decoder 520 extracts predetermined information (container target data) such as network access information, command information, and a media file inserted in the audio stream. The predetermined information extracted by the audio decoder 520 in this manner is transmitted to the CPU 501. Subsequently, under the control of the CPU 501, information processing using the predetermined information is appropriately performed in each of portions of the television receiver 500.

[Exemplary Configuration of HDMI Transmission Unit and HDMI Reception Unit]

Figure 16:
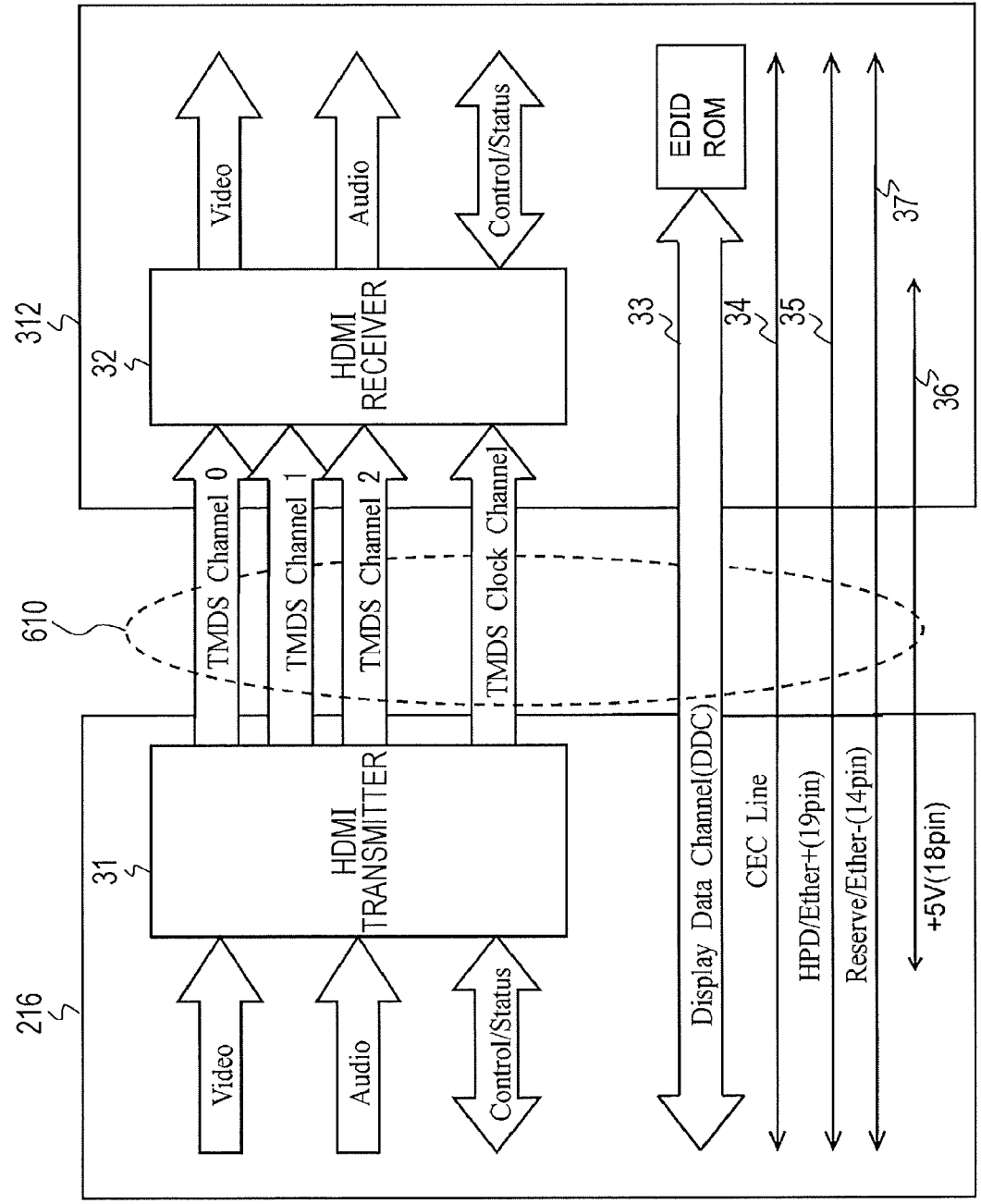
FIG. 16 is a block diagram illustrating an exemplary configuration of an HDMI transmission unit and an HDMI reception unit.

FIG. 16 illustrates an exemplary configuration of the HDMI transmission unit 216 (refer to FIG. 13) of the set top box 200 and the HDMI reception unit 312 (refer to FIG. 14) of the audio amplifier 300 in the transmission-reception system 10 in FIG. 1. Note that due to the similarity of configuration in cases of the HDMI transmission unit 317 of the audio amplifier 300 and the HDMI reception unit 516 of the television receiver 500, the description thereof will be omitted.

In an effective image interval 21 (hereinafter appropriately referred to as an "active video interval") (refer to FIG. 17) which is an interval obtained by excluding a horizontal blanking interval 22 and a vertical blanking interval 23 from the interval starting from one vertical synchronization signal to the next vertical synchronization signal, the HDMI transmission unit 216 transmits a differential signal corresponding to pixel data of an uncompressed image for one screen to the HDMI reception unit 312 in one direction via a plurality of channels. Moreover, in the horizontal blanking interval 22 or the vertical blanking interval 23, the HDMI transmission unit 216 transmits the differential signals corresponding to at least sound data, control data, other auxiliary data, or the like, attached to the image to the HDMI reception unit 312 in one direction via a plurality of channels.

That is, the HDMI transmission unit 216 includes an HDMI transmitter 31. For example, the transmitter 31 converts, for example, pixel data of an uncompressed image into a corresponding differential signal, and serially transmits the differential signal to the HDMI reception unit 312 via a plurality of channels, namely, three transition minimized differential signaling (TMDS) channels #0, #1, and #2, in one direction.

Moreover, the transmitter 31 converts the sound data attached to the uncompressed image, and furthermore, necessary control data and other auxiliary data or the like, into corresponding differential signals, and serially transmits the signals to the HDMI reception unit 312 in one direction via the three TMDS channels #0, #1, and #2.

In the active video interval 21 (refer to FIG. 17), the HDMI reception unit 312 receives the differential signal corresponding to the pixel data transmitted in one direction from the HDMI transmission unit 216 via a plurality of channels. Moreover, in the horizontal blanking interval 22 (refer to FIG. 17) or the vertical blanking interval 23 (refer to FIG. 17), the HDMI reception unit 312 receives the differential signals corresponding to the sound data and control data transmitted in one direction from the HDMI transmission unit 216 via a plurality of channels.

The transmission channels of the HDMI system constituted with the HDMI transmission unit 216 and the HDMI reception unit 312 includes the three TMDS channels #0 to #2 as transmission channels for transmitting pixel data and sound data, a TMDS clock channel for transmitting a pixel clock, and in addition to these, transmission channels referred to as a display data channel (DDC) 33 and a consumer electronics control (CEC) line 34.

The DDC 33 is formed with two signal lines included in the HDMI cable 610, and is used by the HDMI transmission unit 216 to read extended display identification data (EDID) from the HDMI reception unit 312 connected via the HDMI cable 610. That is, the HDMI reception unit 312 includes not solely the HDMI receiver 32 but also an EDID read only memory (ROM) that stores EDID as performance information related to its own performance (Configuration/Capability). By reading the EDID by the HDMI transmission unit 216, the decoding capability information on the receiving side is transmitted to the transmitting side.

Using the DDC 33, the HDMI transmission unit 216 reads the EDID from the HDMI reception unit 312 connected via the HDMI cable 610. Then, on the basis of the EDID, the CPU 201 of the set top box 200 recognizes the performance of the audio amplifier 300 including the HDMI reception unit 312.

The CEC line 34 is formed with one signal line included in the HDMI cable 610, and is used for bidirectional communication of control data between the HDMI transmission unit 216 and the HDMI reception unit 312. Moreover, the HDMI cable 610 includes an HPD line 35 connected to a pin referred to as a hot plug detect (HPD).

Using the HPD line 35, the source device can detect connection of the sink device (destination device) by a DC bias potential. In this case, when viewed from the source device side, the HPD line 35 has a function of receiving notification of the connection state from the sink device by the DC bias potential. In contrast, when viewed from the sink device side, the HPD line has a function of notifying the source device of the connection state by the DC bias potential. Moreover, the HDMI cable 610 includes a power supply line 36 used to supply power from the source device to the sink device.

Moreover, the HDMI cable 610 includes a reserved line 37. There exists an HDMI Ethernet channel (HEC) that transmits an Ethernet signal using the HPD line 35 and the reserved line 37. Moreover, there exists an audio return channel (ARC) that transmits audio data from the destination device (sink device) to the source device using both the HPD line 35 and the reserved line 37 or using solely the HPD line 35. Note that "Ethernet" is a registered trademark.

Figure 17:
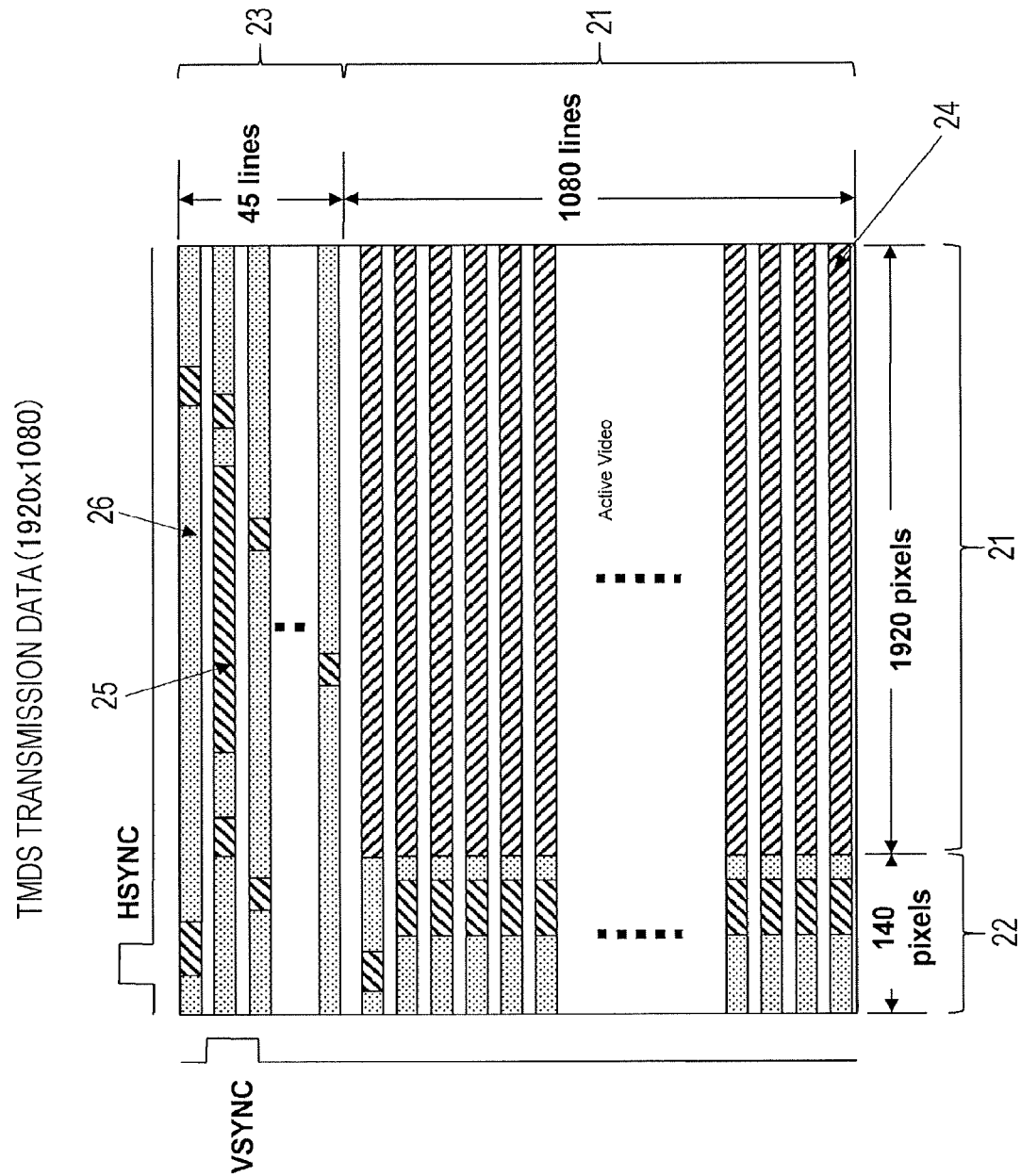
FIG. 17 is a diagram illustrating intervals of various types of transmission data in a case where image data is transmitted on a TMDS channel.

FIG. 17 illustrates various transmission data intervals in a case where image data having width and height of 1920 pixels×1080 lines is transmitted via the TMDS channel. A video field (Video Field) in which transmission data is transmitted via three TMDS channels of HDMI includes three types of intervals, namely, a video data interval 24 (Video Data Period), a data island interval 25 (Data Island Period), and a control interval 26 (Control Period).

Note that the video field interval is an interval from a rising edge (Active Edge) of a certain vertical synchronization signal to a rising edge of the next vertical synchronization signal, and classified into a horizontal blanking period 22 (Horizontal Blanking), a vertical blanking period 23 (Vertical Blanking) and an effective pixel interval 21 (Active Video), which is an interval obtained by excluding the horizontal blanking period and the vertical blanking period from the video field interval.

The video data interval 24 is allocated to the effective pixel interval 21. In this video data interval 24, data of 1920 pixels×1080 lines of effective pixels (Active Pixels) constituting uncompressed image data for one screen is transmitted. The data island interval 25 and the control interval 26 are allocated to the horizontal blanking period 22 and the vertical blanking period 23. In this data island interval 25 and control interval 26, auxiliary data (Auxiliary Data) is transmitted.

That is, the data island interval 25 is allocated to a portion of the horizontal blanking period 22 and the vertical blanking period 23. For example, a packet of sound data, which is not related to control among the auxiliary data, is transmitted in this data island interval 25. The control interval 26 is allocated to other portions of the horizontal blanking period 22 and the vertical blanking period 23. Data related to control among the auxiliary data, for example, a vertical synchronization signal, a horizontal synchronization signal, and a control packet is transmitted in the control interval 26.

As described above, in the transmission-reception system 10 illustrated in FIG. 1, the broadcast delivery apparatus 100 is configured to be able to insert each of pieces of divided information obtained by dividing predetermined information (container target data) into a predetermined number of audio frames of an audio stream (audio compressed data stream). With this configuration, it is possible to suppress the size of information inserted in each of the audio frames even when the overall size of the predetermined information is large, and to satisfactorily transmit the predetermined information without affecting the transmission of the audio compressed data.

Moreover, in the transmission-reception system 10 illustrated in FIG. 1, the broadcast delivery apparatus 100 inserts each of pieces of divided information obtained by dividing predetermined information (container target data) into a predetermined number of audio frames of the audio stream (audio compressed data stream), and adds information indicating the overall size of the predetermined information to the first piece of divided information. With this configuration, when obtaining each of the pieces of divided information constituting the predetermined information from the predetermined number of audio frames, it is possible on the receiving side to ensure sufficient space for storing the predetermined information in a storage medium on the basis of the information indicating the overall size of the predetermined information at a time point where the first piece of divided information is obtained, and to easily and appropriately perform processing of obtaining the predetermined information.

Moreover, in the transmission-reception system 10 illustrated in FIG. 1, the broadcast delivery apparatus 100 divides the predetermined information (container target data) and inserts the information into a plurality of audio frames of the audio stream, and adds information indicating whether it is the first piece of divided information and counts in descending order as information indicating the divided position into each of the divided information. With this configuration, it is possible on the receiving side to recognize the first piece of divided information from the information indicating whether it is the first piece of divided information, and recognize the number of divisions from the counts in descending order corresponding to the first piece of divided information, and further recognize the number of pieces of remaining divided information from the counts in descending order, and possible to easily and appropriately perform processing of obtaining the predetermined information.

2. Modification Example

Note that the above-described embodiment is a case where predetermined information (container target data) such as network access information, command information, and a media file is inserted in the audio stream (audio compressed data stream) on the broadcast delivery apparatus 100. Alternatively, it is also conceivable to configure such that the set top box 200 inserts predetermined information into the audio stream.

In this case, while the predetermined information may be generated in the set top box 200 or may be input from the outside, it is also conceivable that the information is transmitted from the broadcast delivery apparatus 100 in the state of being inserted into a layer of the transport stream TS as a container. Note that the access information transmitted in the container may also be included in information transmitted as trigger information or event information (transmitted by DSM-CC).

Figure 18:
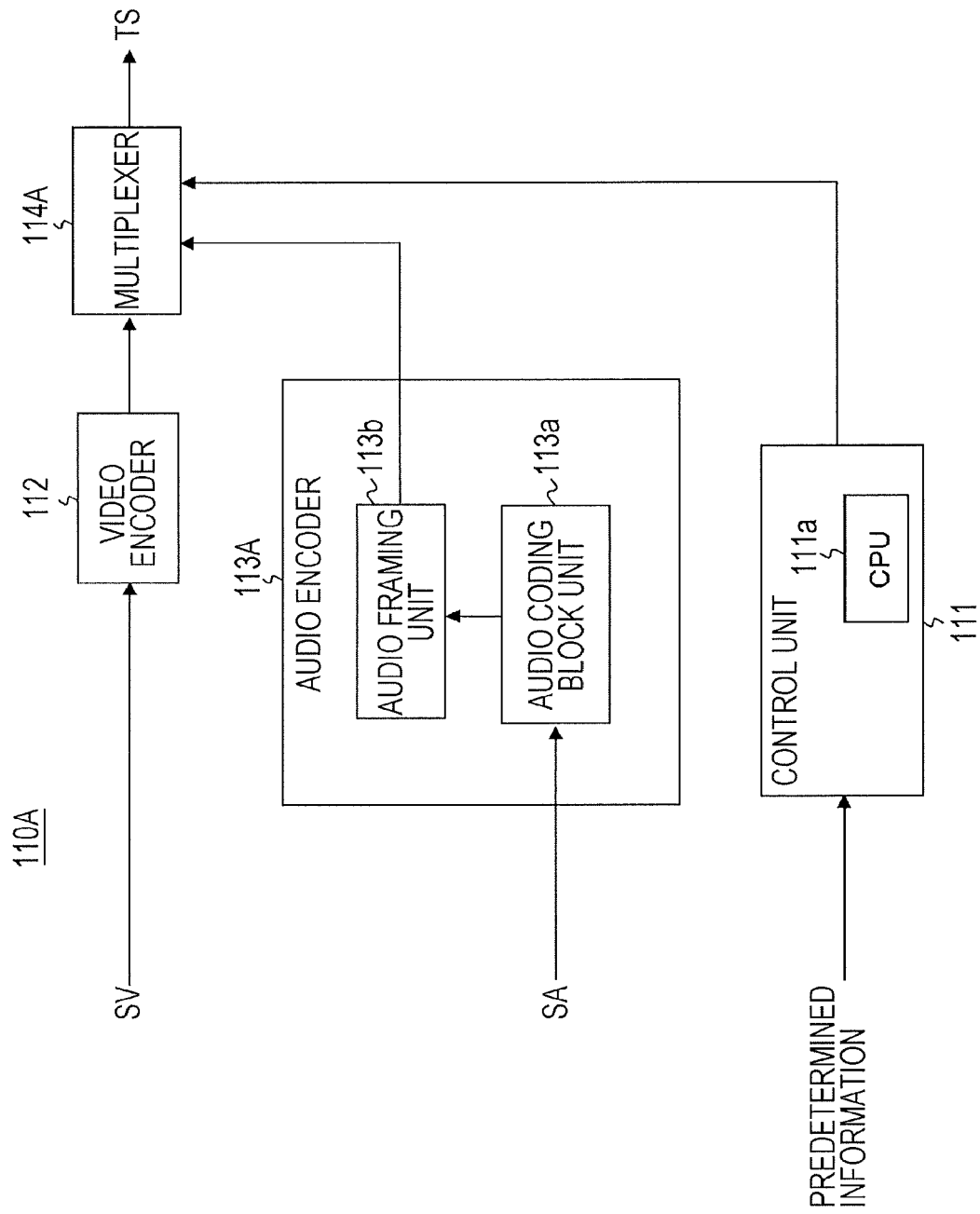
FIG. 18 is a block diagram illustrating another exemplary configuration of a stream generation unit of a broadcast delivery apparatus.

FIG. 18 illustrates an exemplary configuration of a stream generation unit 110A included in the broadcast delivery apparatus 100 in this case. In FIG. 18, portions corresponding to the portions in FIG. 3 are denoted by the same reference numerals, and detailed description thereof is omitted as appropriate. The stream generation unit 110A includes the control unit 111, the video encoder 112, an audio encoder 113A, and a multiplexer 114A.

The audio encoder 113A performs coding on the audio data SA with the compression format of MPEG-H 3D Audio, thereby generating an audio stream (audio compressed data stream). Unlike the audio encoder 113 in the stream generation unit 110 in FIG. 3, the audio encoder 113A does not insert predetermined information into the audio stream.

The video stream generated by the video encoder 112 is supplied to the multiplexer 114A. Moreover, the audio stream generated by the audio encoder 113A is supplied to the multiplexer 114A. Subsequently, the multiplexer 114A packetizes and multiplexes the streams supplied from the individual encoders, thereby obtaining the transport stream TS as transmission data.

At this time, predetermined information (container target data) such as network access information, command information, and a media file is supplied from the control unit 111 to the multiplexer 114A, and in the demultiplexer 114A, this predetermined information is inserted in the layer of the transport stream TS as a container.

For example, in the multiplexer 114A, a newly defined application descriptor (Application_descriptor) having predetermined information is inserted under an application information table (AIT).

FIG. 19 illustrates a structural example (Syntax) of the application descriptor. The 8-bit field of "descriptor_tag" indicates the type of the descriptor. Herein, the field indicates that it is an application descriptor. The 8-bit field of "descriptor_length" indicates the length (size) of the descriptor and indicates the subsequent byte length as the length of the descriptor. Following the "descriptor_length" field, there exists a field of access information (Access_information ( )) (refer to FIG. 7) having predetermined information.

Figure 20:
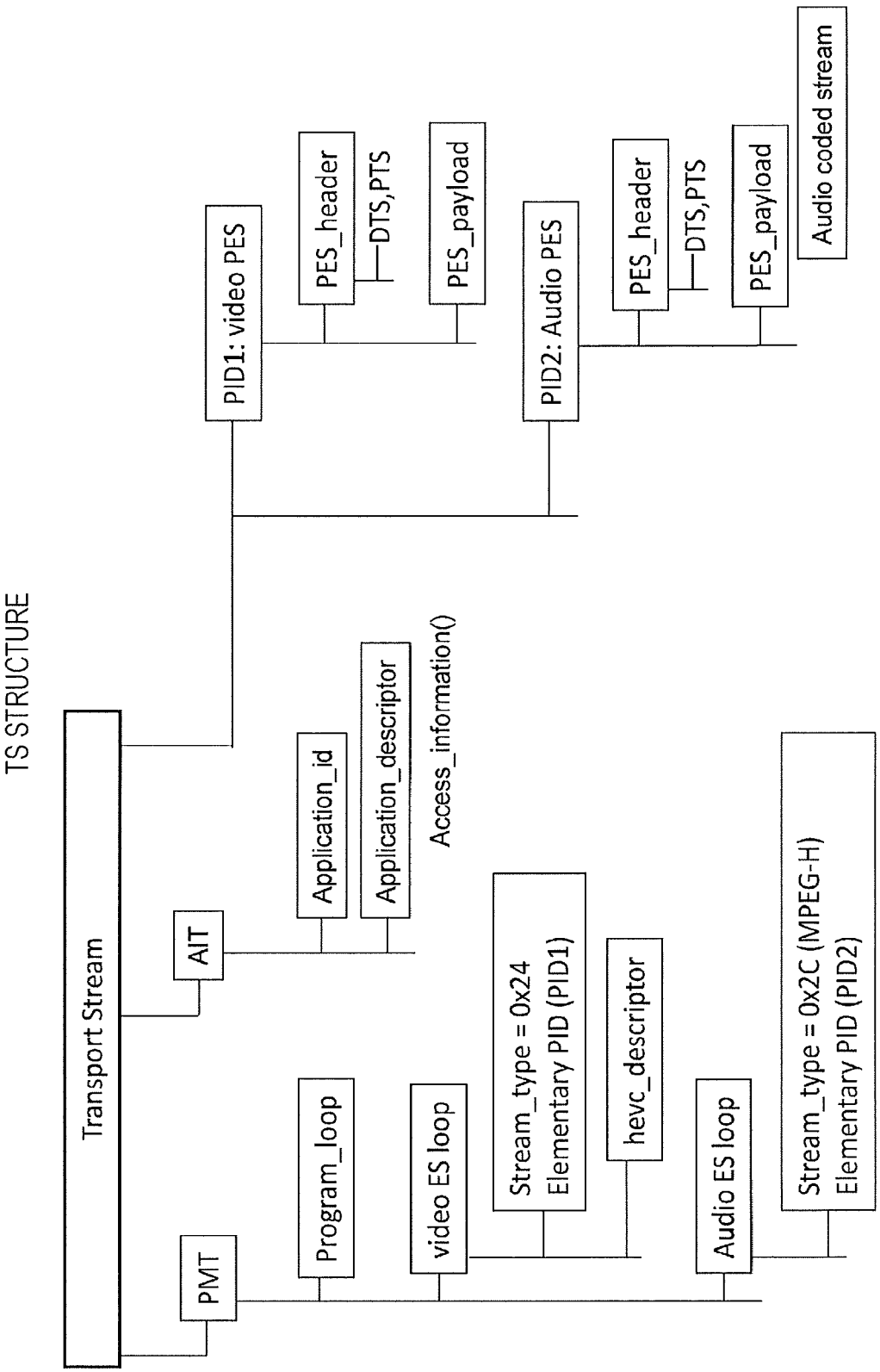
FIG. 20 is a diagram illustrating an exemplary structure of a transport stream TS in the case of transmitting predetermined information (container target data) inserted into a container.

FIG. 20 illustrates an exemplary structure of the transport stream TS in a case where an application descriptor (Application_descriptor) is inserted under the AIT. In this structural example, an audio stream (Audio coded stream) is inserted in the PES payload of the PES packet of the audio stream. However, access information (Access_information ( )) including predetermined information (container target data) is not inserted into this audio stream.

Moreover, the transport stream TS includes an application information table (AIT) in addition to the program map table (PMT). Under the AIT, an application descriptor (refer to FIG. 19) is arranged together with an application identifier (Application_id).

Figure 21:
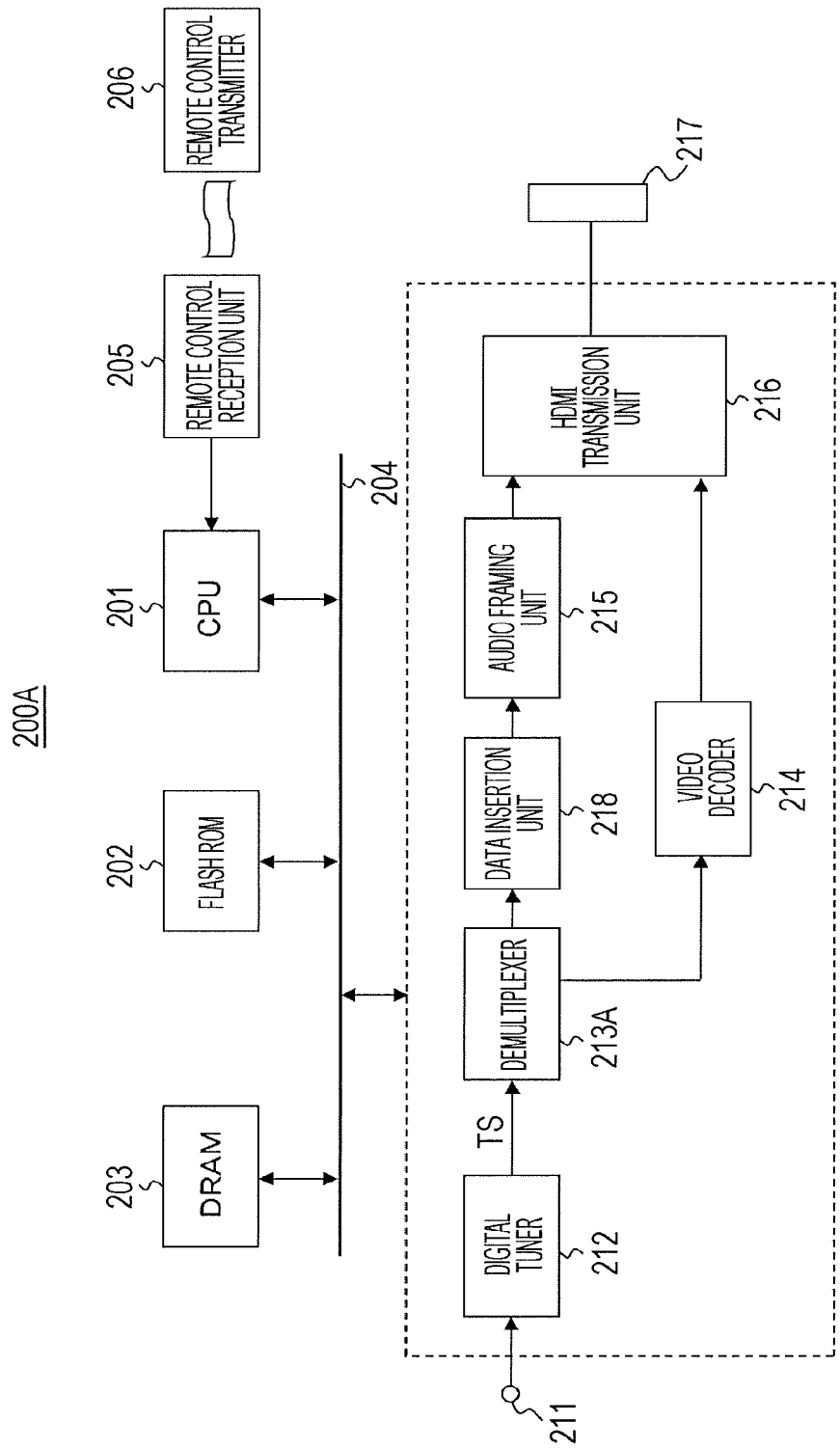
FIG. 21 is a block diagram illustrating another exemplary configuration of a set top box.

FIG. 21 illustrates an exemplary configuration of a set top box 200A configured to insert predetermined information into an audio stream. In FIG. 21, portions corresponding to the portions in FIG. 13 are denoted by the same reference numerals, and detailed description thereof is omitted as appropriate. The set top box 200A includes a CPU 201, a flash ROM 202, a DRAM 203, an internal bus 204, a remote control reception unit 205, and a remote control transmitter 206. Moreover, the set top box 200A includes the antenna terminal 211, the digital tuner 212, a demultiplexer 213A, the video decoder 214, a data insertion unit 218, the audio framing unit 215, the HDMI transmission unit 216, and the HDMI terminal 217.

Moreover, the demultiplexer 213 extracts a packet of the audio stream from the transport stream TS, thereby reconstructing the audio stream (audio compressed data stream). Moreover, the demultiplexer 213A extracts various descriptors, or the like, from the transport stream TS and transmits it to the CPU 201. This descriptor also includes an application descriptor (refer to FIG. 19) having predetermined information.

The audio stream extracted by the demultiplexer 213A is supplied to the data insertion unit 218. Predetermined information is supplied from the CPU 201 to the data insertion unit 218. The data insertion unit 218 inserts the predetermined information into the audio stream under the control of the CPU 201.

In this case, similarly to the audio encoder 113 of the stream generation unit 110 in FIG. 3, the predetermined information is divided and inserted into a predetermined number (including one) of audio frames of the audio stream (refer to FIGS. 9 to 11). At this time, information indicating the overall size of the predetermined information is added to the first piece of divided information. Moreover, information indicating whether the divided information is the first piece of divided information and counts in descending order as information indicating the divided position are added to each of the pieces of divided information.

Note that, in this case, the number of divisions is determined such that the bit rate of the audio stream into which the predetermined information is inserted falls within the transmission bandwidth capacity range of HDMI. As a result, depending on the overall size of the predetermined information, the overall predetermined information might be inserted into one audio frame without being divided, in some cases.

The audio stream into which the predetermined information from the data insertion unit 218 is inserted is framed by the audio framing unit 215 and then supplied to the HDMI transmission unit 216. In the set top box 200A illustrated in FIG. 21, the other portions are configured similarly to the set top box 200 illustrated in FIG. 13.

Moreover, the above-described embodiment illustrates an example in which the audio compression format is MPEG-H 3D Audio. Alternatively, the present technology can also be applied, in a similar manner, to the case where the audio compression format is other audio compression formats such as AAC, AC3, and AC4.

Moreover, in the above-described embodiment, the set top box 200 is configured to receive the video stream and the audio stream from the broadcast signal coming from the broadcast delivery apparatus 100. Alternatively, it is also conceivable that the set top box 200 receives a video stream and an audio stream from a distribution server (streaming server) via a network.

Moreover, the above-described embodiment illustrates an example in which the container is a transport stream (MPEG-2 TS). The present technology, however, can also be applied, in a similar manner, to a system in which delivery is performed by a container of MP4 or other formats. Examples of this include an MPEG-DASH based stream distribution system and a transmission-reception system handling an MPEG media transport (MMT) structure transmission stream.

Figure 22:
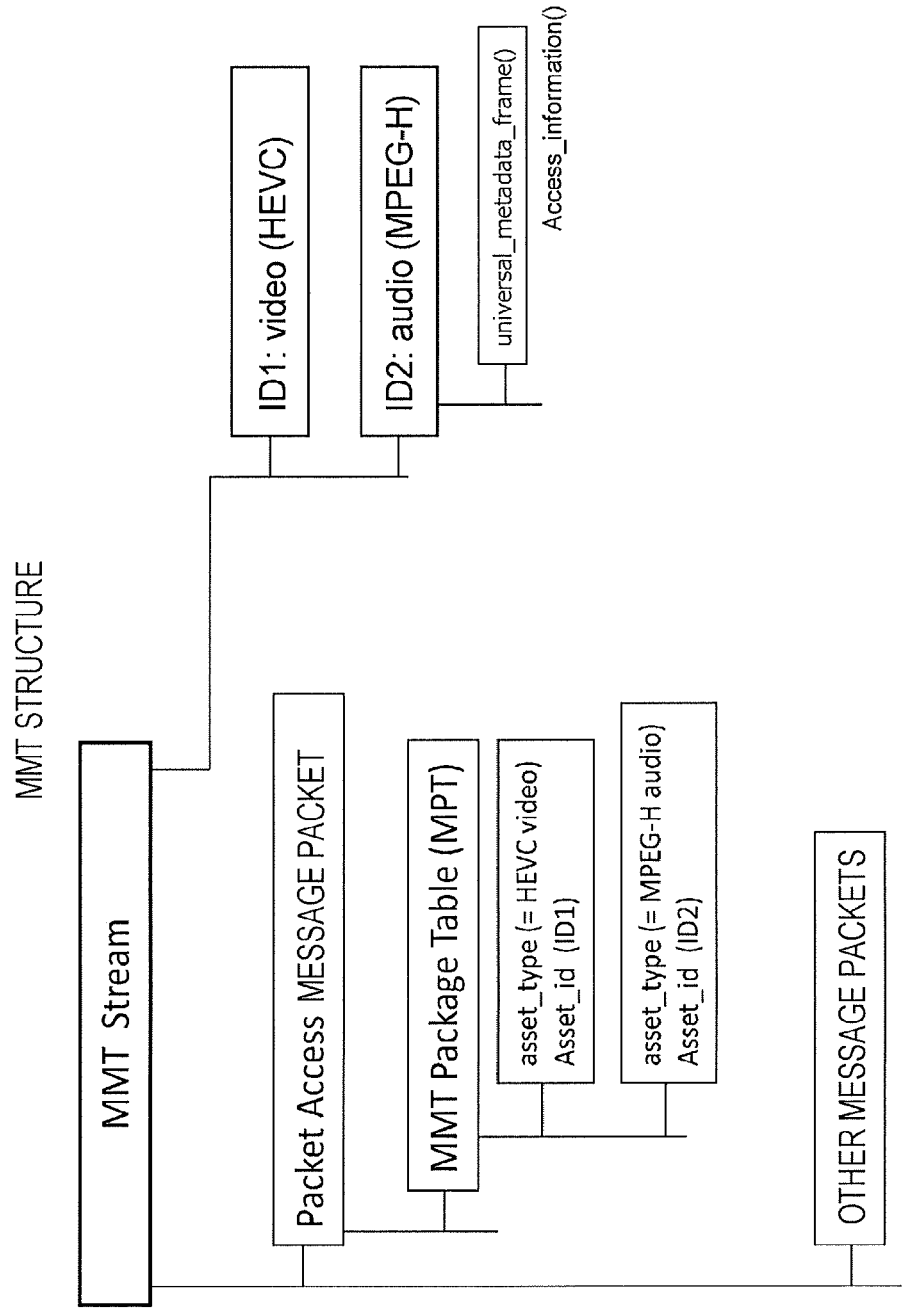
FIG. 22 is a diagram illustrating an exemplary structure of an MMT stream in the case of transmitting predetermined information (container target data) inserted into an audio stream.

FIG. 22 illustrates an exemplary structure of an MMT stream in the case of transmitting predetermined information (container target data) inserted into an audio stream. The MMT stream includes MMT packets of individual assets such as video and audio. In this structural example, there exists an MMT packet of an audio asset identified by ID2, together with an MMT packet of a video asset identified by ID1.

Access information (Access_information ( )) including predetermined information (container target data) is inserted in a universal metadata frame (universal_metadata_frame ( )) in a predetermined number (including one) of audio frames of audio assets (audio stream).

Moreover, the MMT stream includes a message packet such as a packet access (PA) message packet. The PA message packet includes a table such as MMT packet table (MMT Package Table). The MP table contains information for individual assets.

Figure 23:
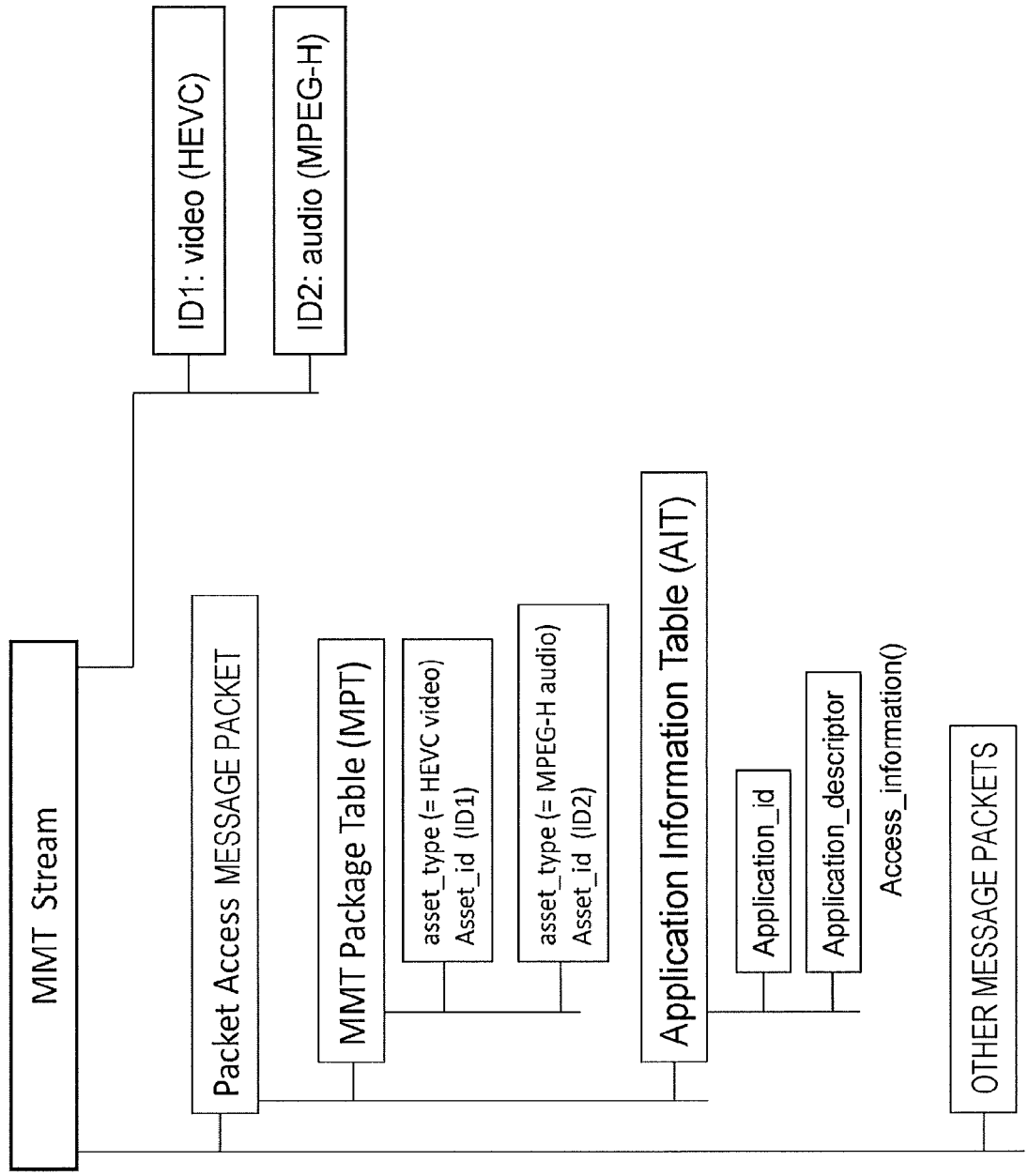
FIG. 23 is a diagram illustrating an exemplary structure of an MMT stream in the case of transmitting predetermined information (container target data) inserted into a container.

FIG. 23 illustrates an exemplary structure of an MMT stream in the case of transmitting predetermined information (container target data) inserted into a container. The MMT stream includes MMT packets of individual assets such as video and audio. In this structural example, there exists an MMT packet of an audio asset identified by ID2, together with an MMT packet of a video asset identified by ID1. In this structural example, unlike the structure example of FIG. 22, predetermined information (container target data) is not included in the audio asset (audio stream).

Moreover, the MMT stream includes a message packet such as a packet access (PA) message packet. The PA message packet includes an MMT•packet table (MPT: MMT Package Table). The MPT contains information for individual assets. Moreover, the PA message packet includes an application information table (AIT). The application descriptor (Application_descriptor) having access information (Access_information ( )) is inserted under the AIT.

Figure 24:
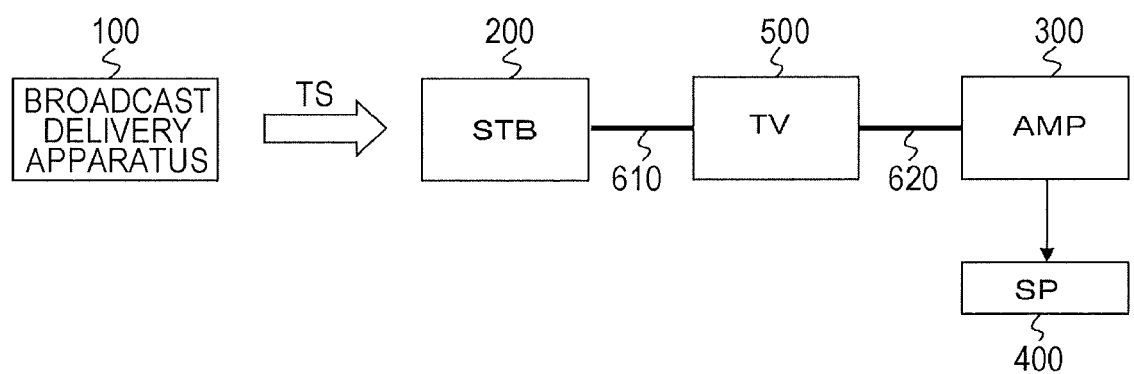
FIG. 24 is a block diagram illustrating another exemplary configuration of the transmission-reception system.

Moreover, the above-described embodiment illustrates an example in which the audio amplifier 300 is interposed between the set top box 200 and the television receiver 500. Alternatively, it is also conceivable to provide a transmission-reception system 10A as illustrated in FIG. 24 in which the set top box 200 is directly connected to the television receiver 500.

In the transmission-reception system 10A, the set top box 200 and the television receiver 500 are connected with each other via the HDMI cable 610. In this case, the set top box 200 is the source and the television receiver 500 is the destination. The audio amplifier 300 and the television receiver 500 are connected with each other via the HDMI cable 620. In this case, the audio amplifier 300 is the source and the television receiver 500 is the destination.

In this case, uncompressed video data and an audio stream into which predetermined information (container target data) such as network access information and a media file is inserted is transmitted from the set top box 200 to the television receiver 500 by an HDMI digital interface. Moreover, the audio stream itself or the decoded audio data is transmitted from the television receiver 500 to the audio amplifier 300 using an audio return channel of HDMI.

Moreover, the above-described embodiment illustrates the transmission-reception system 10 having the set top box 200 and the television receiver 500. Alternatively, it is also conceivable to provide a configuration in which a monitor device, a projector, or the like, is arranged instead of the television receiver 500. Still alternatively, it is also conceivable to provide a configuration in which a recorder or a personal computer with a receiving function, or the like, is arranged instead of the set top box 200.

Moreover, in the above-described embodiment, each of the devices on the receiving side is connected by wires using an HDMI digital interface. However, the present invention can of course be applied, in a similar manner, to a case where each of the devices is mutually connected by wires using a digital interface similar to HDMI, and also can be applied to a case where each of the devices is mutually connected wirelessly.

Moreover, the present technology may also be configured as below.

(1) A transmission apparatus including:
an information insertion unit configured to insert predetermined information into an audio compressed data stream; and
a stream transmission unit configured to transmit the audio compressed data stream into which the predetermined information is inserted,
in which the information insertion unit is capable of inserting each of pieces of divided information obtained by dividing the predetermined information into a predetermined number audio frames of the audio compressed data stream, and
adds information indicating the overall size of the predetermined information to a first piece of divided information.

(2) The transmission apparatus according to claim 1,
in which the information insertion unit inserts the divided information into a user data region of the audio frame.

(3) The transmission apparatus according to (1) or (2),
in which the information insertion unit further adds information indicating whether the divided information is the first piece of divided information and information indicating a divided position to each of the pieces of divided information.

(4) The transmission apparatus according to any of (1) to (3),
in which the predetermined information is one of network access information, command information, and a media file.

(5) The transmission apparatus according to any of (1) to (4),
in which the stream transmission unit transmits a container of a predetermined format including the audio compressed data stream into which the predetermined information is inserted.

(6) The transmission apparatus according to any of (1) to (4),
in which the stream transmission unit transmits the audio compressed data stream into which the predetermined information is inserted to an external device via a digital interface.

(7) The transmission apparatus according to (6), further including
a reception unit configured to receive a container of a predetermined format including an audio compressed data stream,
in which predetermined information is inserted in a layer of the container, and
the information insertion unit inserts the predetermined information inserted in the layer of the container into the audio compressed data stream included in the container.

(8) A transmission method including:
an information insertion step of inserting predetermined information into an audio compressed data stream; and
a stream transmission step of transmitting, by stream transmission unit, the audio compressed data stream into which the predetermined information is inserted,
in which the information insertion step
is capable of inserting each of pieces of divided information obtained by dividing the predetermined information into a predetermined number of audio frames of the audio compressed data stream, and
adds information indicating the overall size of the predetermined information to a first piece of divided information.

(9) A reception apparatus including
a stream reception unit configured to receive an audio compressed data stream into which predetermined information is inserted, from an external device via a digital interface,
each of pieces of divided information obtained by dividing the predetermined information being inserted in a predetermined number of audio frames of the audio compressed data stream,
information indicating the overall size of the predetermined information being added to a first piece of divided information, and
the reception apparatus further including:
a decode processing unit configured to obtain audio data by performing decode processing on the audio compressed data stream and obtain each of the pieces of divided information constituting the predetermined information from the predetermined number of audio frames on the basis of the information indicating the overall size of the predetermined information; and
an information processing unit configured to perform information processing using the predetermined information obtained by the decode processing unit.
(10) The reception apparatus according to (9),
in which the predetermined information is one of network access information, command information, and a media file.
(11) A reception method including
a stream reception step of receiving an audio compressed data stream into which predetermined information is inserted, by a stream reception unit from an external device via a digital interface,
each of pieces of divided information obtained by dividing the predetermined information being inserted in a predetermined number of audio frames of the audio compressed data stream,
information indicating the overall size of the predetermined information being added to a first piece of divided information, and
the reception method further including:
a decode processing step of obtaining audio data by performing decode processing on the audio compressed data stream and obtaining each of the pieces of divided information constituting the predetermined information from the predetermined number of audio frames on the basis of the information indicating the overall size of the predetermined information; and
an information processing step of performing information processing using the predetermined information obtained by the decode processing step.
(12) A reception apparatus including:
a reception unit configured to receive a container of a predetermined format including an audio compressed data stream;
an information insertion unit configured to insert predetermined information into the audio compressed data stream; and
a stream transmission unit configured to transmit the audio compressed data stream into which the predetermined information is inserted to an external device via a digital interface.
(13) The reception apparatus according to (12),
in which the information insertion unit is capable of inserting each of pieces of divided information obtained by dividing the predetermined information into a predetermined number of audio frames of the audio compressed data stream.
(14) The reception apparatus according to (13),
in which the information insertion unit inserts the divided information into a user data region of the audio frame.
(15) The reception apparatus according to (13) or (14),
in which the information insertion unit adds information indicating the overall size of the predetermined information to a first piece of divided information.
(16) The reception apparatus according to (15),
in which the information insertion unit further adds information indicating whether the divided information is the first piece of divided information and information indicating a divided position to each of the pieces of divided information.
(17) The reception apparatus according to any of (12) to (16),
in which the predetermined information is one of network access information, command information, and a media file.
(18) The reception apparatus according to any of (12) to (17),
in which the predetermined information is inserted in a layer of the received container, and
the information insertion unit extracts the predetermined information inserted in the layer of the container and inserts the extracted information into the audio compressed data stream.
(19) A reception method including:
a reception step of receiving a container of a predetermined format including an audio compressed data stream by a reception unit;
an information insertion step of inserting predetermined information into the audio compressed data stream; and
a stream transmission step of transmitting the audio compressed data stream into which the predetermined information is inserted to an external device via a digital interface.

A main feature of the present technology is to provide a configuration in which, when dividing and inserting predetermined information (container target data) into a plurality of audio frames of an audio stream, information indicating the overall size of predetermined information is added to a first piece of divided information. With this configuration, it is possible on the receiving side to ensure sufficient space for storing the predetermined information in a storage medium on the basis of the information indicating the overall size of the predetermined information at a time point where the first piece of divided information is obtained, making it possible to perform processing of obtaining the predetermined information easily and appropriately (refer to FIGS. 6 and 9).

REFERENCE SIGNS LIST

10, 10A Transmission-reception system
21 Effective pixel interval
22 Horizontal blanking period
23 Vertical retrace period
24 Video data interval
25 Data island interval
26 Control interval
31 HDMI transmitter
32 HDMI Receiver
33 DDC
34 CEC line
35 HPD line
36 Power supply line
37 Reserved line
100 Broadcast delivery apparatus
110, 110A Stream generation unit
111 Control unit 111a CPU
112 Video encoder
113, 113A Audio encoder
113a Audio coding block unit
113b Audio framing unit
114, 114A Multiplexer
200, 200A Set top box (STB)
201 CPU
202 Flash ROM
203 DRAM
204 Internal bus
205 Remote control reception unit
206 Remote control transmitter
211 Antenna terminal
212 Digital tuner
213, 213A Demultiplexer
214 Video decoder
215 Audio framing unit
216 HDMI transmission unit
217 HDMI terminal
218 Data insertion unit
300 Audio amplifier (AMP)
301 CPU
302 Flash ROM
303 DRAM
304 Internal bus
305 Remote control reception unit
306 Remote control transmitter
311 HDMI terminal
312 HDMI reception unit
313 Audio decoder
314 Audio processing circuit
315 Sound amplification circuit
316 Sound output terminal
317 HDMI transmission unit
318 HDMI terminal
400 Speaker system (SP)
500 Television receiver (TV)
501 CPU
502 Flash ROM
503 DRAM
504 Internal bus
505 Remote control reception unit
506 Remote control transmitter
507 Communication interface
511 Antenna terminal
512 Digital tuner
513 Demultiplexer
514 Video decoder
515 HDMI terminal
516 HDMI reception unit
517 Video processing circuit
518 panel drive circuit
519 display panel
520 Audio decoder
521 Audio processing circuit
522 Sound amplification circuit
523 Speaker
610, 620 HDMI cable

The invention claimed is:

1. A transmission apparatus, comprising:
processing circuitry configured to:
obtain pieces of divided information by dividing a piece of predetermined information;
include size information in a starting piece of the pieces of divided information, the size information indicating an overall size of the piece of predetermined information;
insert the pieces of divided information into various frames of an audio compressed data stream; and
transmit the audio compressed data stream that has the pieces of divided information inserted therein.

2. The transmission apparatus according to claim 1, wherein the processing circuitry is configured to insert each one of the pieces of divided information into a user data region of a corresponding one of the audio frames.

3. The transmission apparatus according to claim 1, wherein processing circuitry is further configured to include, in each one of the pieces of divided information,
first information indicating whether the one of the pieces of divided information is the starting piece of the pieces of divided information, and
second information indicating a divided position of the one of the pieces of divided information.

4. The transmission apparatus according to claim 1, wherein the piece of predetermined information is one of network access information, command information, and a media file.

5. The transmission apparatus according to claim 1, wherein the processing circuitry is configured to transmit a container that includes the audio compressed data stream.

6. The transmission apparatus according to claim 1, wherein the processing circuitry is configured to transmit the audio compressed data stream to an external device via a digital interface.

7. The transmission apparatus according to claim 1, wherein the processing circuitry is further configured to:
receive a container including an original audio compressed data stream; and
obtain the piece of predetermined information from a layer of the container; and
obtain the audio compressed data stream that has the pieces of divided information inserted therein according to the piece of predetermined information and the original audio compressed data stream included in the container.

8. A reception apparatus, comprising processing circuitry configured to:
receive an audio compressed data stream from an external device via a digital interface,
pieces of divided information being inserted into various frames of the audio compressed data stream,
the pieces of divided information being obtained by dividing a piece of predetermined information, and
size information indicating an overall size of the piece of predetermined information being included in a starting piece of the pieces of divided information;
obtain audio data by decoding the audio compressed data stream;
obtain the pieces of divided information from the audio frames on the basis of the size information indicating the overall size of the piece of predetermined information;
obtain the piece of predetermined information based on the pieces of divided information; and
control information processing according to the piece of predetermined information.

9. The reception apparatus according to claim 8,
wherein the piece of predetermined information is one of network access information, command information, and a media file.

10. A reception apparatus, comprising:
processing circuitry configured to:
  receive a container that includes an original audio compressed data stream and a piece of predetermined information;
  obtain pieces of divided information by dividing the piece of predetermined information;
  include size information in a starting piece of the pieces of divided information, the size information indicating an overall size of the piece of predetermined information;
  obtain a processed audio compressed data stream according to the original audio compressed data stream and the pieces of divided information, the pieces of divided information being inserted into various frames of the processed audio compressed data stream; and
  transmit the processed audio compressed data stream that has the pieces of divided information inserted therein to an external device via a digital interface.

11. The reception apparatus according to claim 10,
wherein the processing circuitry is configured to insert each one of the pieces of divided information into a user data region of a corresponding one of the audio frames.

12. The reception apparatus according to claim 10,
wherein the processing circuitry is further configured to include, in each one of the pieces of divided information,
  first information indicating whether the one of the pieces of divided information is the starting piece of the pieces of divided information, and
  second information indicating a divided position of the one of the pieces of divided information.

13. The reception apparatus according to claim 10,
wherein the piece of predetermined information is one of network access information, command information, and a media file.

14. The reception apparatus according to claim 10, wherein
  the predetermined information is included in a layer of the received container, and
  the wherein the processing circuitry is further configured to obtain the piece of predetermined information from the layer of the container.

\* \* \* \* \*